US012807403B2

(12) United States Patent
Lukas et al.

(10) Patent No.: US 12,807,403 B2
(45) Date of Patent: Nov. 24, 2026

(54) DEVICE FOR COLLECTING AND COMPACTING WASTE

(71) Applicant: DLR GbR, Gräfelfing (DE)

(72) Inventors: Christian Joseph Lukas, Gräfelfing (DE); Daniel Christoph Davenport, Gräfelfing (DE); Andrzei Von Schuttenbach Pyziak, Ingolstadt (DE)

(73) Assignee: DLR GbR, Grafelfing (DE)

( * ) Notice: Subject to any disclaimer, the term of this patent is extended or adjusted under 35 U.S.C. 154(b) by 124 days.

(21) Appl. No.: 18/707,352

(22) PCT Filed: Oct. 14, 2022

(86) PCT No.: PCT/EP2022/078628
§ 371 (c)(1),
(2) Date: May 3, 2024

(87) PCT Pub. No.: WO2023/078655
PCT Pub. Date: May 11, 2023

(65) Prior Publication Data

US 2026/0001713 A1 Jan. 1, 2026

(30) Foreign Application Priority Data

Nov. 4, 2021 (EP) .................................... 21206532

(51) Int. Cl.
*B65F 1/14* (2006.01)
*B30B 1/00* (2006.01)
*B65F 1/16* (2006.01)

(52) U.S. Cl.
CPC ............ *B65F 1/1405* (2013.01); *B30B 1/003* (2013.01); *B65F 2001/1676* (2013.01);
(Continued)

(58) Field of Classification Search
CPC ....... B30B 1/003; B65F 1/1405; B65F 1/1415
See application file for complete search history.

(56) References Cited

U.S. PATENT DOCUMENTS 4,592,192 A 6/1986 Jacob et al.
5,027,578 A 7/1991 Natterer et al.
7,285,928 B1 10/2007 Jolly et al.

FOREIGN PATENT DOCUMENTS

CH 700180 B1 * 7/2010 ............ B65F 1/1405
CN 110947473 A 4/2020
(Continued)

OTHER PUBLICATIONS

International Search Report issued in Int'l Application No. PCT/EP2022/078628, mailed Jan. 16, 2023, 7 pages.
(Continued)

*Primary Examiner* — Jared O Brown
*Assistant Examiner* — P Derek Pressley
(74) *Attorney, Agent, or Firm* — McDonnell Boehnen Hulbert & Berghoff LLP

(57) ABSTRACT

The present disclosure relates to a device for collecting and compacting waste, in particular a waste container. The present disclosure furthermore relates to a process for collecting and compacting waste. The process includes aspirating part of the gaseous atmosphere from the waste bag that contains waste, with simultaneous mechanical compression of the waste bag and external air pressure loading of the waste bag.

15 Claims, 25 Drawing Sheets

(52) U.S. Cl.
CPC ... *B65F 2210/167* (2013.01); *B65F 2210/168* (2013.01); *B65F 2210/188* (2013.01)

(56) References Cited

FOREIGN PATENT DOCUMENTS

| | | | | | |
|---|---|---|---|---|---|
| EP | 0 209 639 | A1 | | 1/1987 | |
| EP | 1 498 364 | A1 | | 1/2005 | |
| EP | 3020544 | A1 | * | 5/2016 | ............ B65F 1/1405 |
| EP | 4 177 184 | | | 5/2024 | |
| GB | 2 387 527 | A | | 10/2003 | |
| JP | H01-120997 | | | 8/1989 | |
| JP | H03-275422 | A | | 12/1991 | |
| JP | H07-215403 | A | | 8/1995 | |
| JP | H07323397 | A | * | 12/1995 | ............ B65F 1/1405 |
| JP | 2004115185 | A | | 4/2004 | |
| JP | 202169843 | U | | 3/2012 | |
| WO | 2007/076964 | A1 | | 7/2007 | |
| WO | WO-2020180196 | A1 | * | 9/2020 | ............... B30B 5/02 |

OTHER PUBLICATIONS

Written Opinion issued in Int'l Application No. PCT/EP2022/078628, mailed Jan. 16, 2023, 8 pages.
European Search Report of EP Application No. 21206532 dated Apr. 8, 2022, 1 page.

* cited by examiner

A-A

DEVICE FOR COLLECTING AND COMPACTING WASTE

CROSS REFERENCE TO RELATED APPLICATIONS

The present application is a § 371 national stage of international application no. PCT/EP2022/078628, filed Oct. 14, 2022, which claims priority to European application no. 21206532.0, filed Nov. 4, 2021, the entire contents of both of which are hereby incorporated by reference herein.

FIELD

The present invention relates to a device for collecting and compacting waste, in particular a waste container. The present invention furthermore relates to a process for collecting and compacting waste.

BACKGROUND

Devices for collecting and compacting waste are known in the prior art. EP 209 639 A1 thus discloses a device for compacting kitchen waste. In the device, the waste brought in is exposed to the atmospheric pressure by aspirating the air with a pump, whereby the waste is compacted.

EP 1 498 364 A1 discloses a device for collecting and disposing of dry rubbish, moist waste and the like. The device comprises a container with a cover, which is fastened by means of hermetic sealing elements, with a piston inside, which can slide and which forms a hermetic chamber. Waste compaction and liquid discharge elements, and also air and liquid intake elements are furthermore present, which are connected to the chamber and to the interior of a flexible container. However, the piston is only retracted by a spring, there is no active compression of the waste.

WO 2007/076964 A1 discloses a waste container, inside which there is a bag and a vacuum pump for aspirating gas, in particular air, from the bag, wherein a press unit is provided, with which a material inside the bag can be pressed before aspirating the gas and can be compressed by this means. However, details of the press unit are not disclosed, only a "downwards" driven press plate is mentioned. The publication furthermore discloses a sealing unit for gastight sealing of the bag.

In the waste containers known in the prior art, only atmospheric pressure is therefore substantially used for compacting the waste bag, or an unspecified press plate is driven "downwards". With a typically high spatial requirement for waste comprising rubbish, refuse, containers or the like and low compression, however, both unnecessary space and unnecessary equipment are needed to collect, store and dispose of the rubbish, typically waste bags.

SUMMARY

The aim of the present invention is to overcome the abovementioned disadvantages of the prior art and in particular to provide a waste container in which waste can be collected and stored, compacted as much as possible, and then cleanly disposed of, and which at the same time is easy to operate.

This aim is achieved according to the present invention with a device (1) for collecting and compacting waste comprising a) a container (2) for accommodating a waste bag, the container comprising side walls (3), a base plate (4) and a first seal (5) at the opening (6), b) a cover (7) with a second seal (8), wherein the cover is configured and arranged such that it can be brought to an open position with respect to the opening (6) of the container (2), so that the opening (6) of the container (2) is accessible for placing a waste bag inside, and can be brought to a closed position with respect to the opening (6) of the container (2), so that the cover (7) interacts positively with the opening of the container (2) such that a waste bag placed inside the container (2) between the first seal (5) and the second seal (8) can be sealed airtight against the cover (7), c) means (9) for producing compressed air, d) means (10) for producing negative pressure, and e) means (11) for heat sealing a waste bag placed inside the container (2) when the cover is in the closed position, wherein the means are situated at the opening (6) of the container and/or on the cover (7), wherein in the device, f) the cover (7) has an aspiration opening (12), which is arranged on the cover (7) such that in the closed position, the gaseous atmosphere can be aspirated from the interior of a waste bag placed inside the container (2) by means of the means (10) for producing negative pressure, g) when the opening (6) is closed, the container (2) is airtight, h) the base plate (4) of the container can be moved with respect to the side walls (3) and, in the closed position, in the direction of the cover (7), i) means (14) are provided for moving the base plate (4) with respect to the side walls (3), and j) the container (2) has an inlet port (15) for compressed air, which, controlled by means of an inlet valve (16), can be loaded with compressed air supplied by the means (9) for producing compressed air.

The aim is also achieved by a process for collecting and compacting waste, comprising a) the step of aspirating part of the gaseous atmosphere from a waste bag that contains waste, with b) simultaneous mechanical compression of the waste bag and c) simultaneous external air pressure loading of the waste bag.

This process can be implemented particularly advantageously by a device according to the present invention.

Advantageous configurations of the device and of the process are objects of the subclaims.

The invention is based on the knowledge that it is particularly advantageous to collect and compact waste when the compaction not only takes place by aspirating the air from the waste bag but in particular by additional simultaneous mechanical compression of the waste bag and air pressure loading of same. This results by simple means in waste with a particularly low spatial requirement and therefore the best possible utilisation of resources.

The invention is now described in further detail by means of preferred embodiments.

The device for collecting and compacting waste according to the invention comprises a container for accommodating a waste bag. Typical containers are known in the prior art and are typically substantially cuboid or cylindrical in shape. The container comprises an opening, typically the preferably complete top side, and side walls, typically the 4 side walls of the cuboid or the cylinder surface of the cylinder and a container bottom. According to the invention, the container is airtight when the opening is closed. This means that, if the opening is sealed airtight, the side walls and the container bottom or the moveable base plate inside the container form a self-contained airtight space. Suitable materials are plastic or metal materials, in particular glass fibre reinforced plastic materials, e.g. GFK 30 or GFK 40, PEEK plastics, PA6, and also stainless steel or aluminium.

The container of the device according to the invention furthermore has a first seal at the opening, typically on a surface of the top side of the container perpendicular to the side walls (and parallel to the container bottom). The seal is circumferentially disposed at the opening, that is to say it surrounds the entire opening of the container. This seal is able, with a typical waste bag, to effect an airtight closure of the opening, with appropriate interaction with the second seal on the cover. Suitable sealing materials are known in the prior art.

Insofar as seals are used in the present invention, suitable sealant materials are essentially known to the specialist, typical materials comprising silicone, silicone foam, EPDM, NBR, CR, cellular rubber, foam rubber, fluoroelastomer, e.g. Viton®, fibre sealant based on aramid fibres, e.g. KLINGERSIL®, PTFE (Teflon®), polyurethane (Vulkollan®), PVC and PMMA. Preferred materials for the first and second seals are EPDM and silicone. Fluoroelastomers e.g. Viton® are preferably used with respect to the sealing and cutting electrodes.

In a preferred embodiment, the device has means for fastening a waste bag at the opening of the container, preferably a clamping frame or tension clamps. Such a clamping frame is fastened to the container for example by means of a hinge and surrounds the entire opening of the container. The opening is therefore freely accessible when the frame is folded back, so that a waste bag can be placed in the container, wherein the waste bag makes contact with the first seal in the opening. The clamping frame or tension clamps are then closed and are therefore in a position to fasten the waste bag to the container. In this case, in one embodiment, the first seal, with the waste bag over it, is not covered, or is only partially covered, by the means for fastening a waste bag, and remains in particular substantially accessible for interacting with the second seal of the cover. In an alternative embodiment, the first seal is contacted over the waste bag, if it is placed inside, by the means for fastening a waste bag, and also lies, in the closed position, entirely between the first seal at the container opening and the second seal of the cover. The advantage of using a clamping frame is that, on being placed inside, the waste bag already lies neatly over the first seal at the container opening and can be fastened to the container by the means for fastening a waste bag, preferably the clamping frame or the tension clamps. This ensures better sealing when the second seal on the cover makes contact in the closed position with the waste bag, and if necessary with the means for fastening a waste bag.

The container of the device according to the invention has a moveable base plate inside, which is typically substantially planar. According to the invention, the base plate is designed as a kind of piston, arranged moveably inside the container, i.e. displaceable along the side walls, perpendicular to the surface of the base plate. In one embodiment, the base plate of the container is sealed by a third seal in this case airtight with respect to the side walls. In this embodiment, when the opening is closed, the side walls and the base plate form the airtight inner space of the container. In this embodiment, the base plate preferably has means that allow the compressed air to be driven in the direction of the top side of the base plate. In a preferred alternative embodiment, the base plate of the container is sealed in this case by the third seal, not airtight, with respect to the side walls, rather, when the opening is closed, the side walls and the container bottom form the airtight container. The advantage of the latter embodiment is that the third seal does not need to be airtight with respect to the compressed air as soon as it is fed into the container, which would set higher requirements on the material to be used. An inlet port under the base plate is sufficient for loading the inside of the container with compressed air.

The base plate is essentially moveable with respect to the side walls, and in the direction of the cover (perpendicular to the surface of the base plate) when the cover is in the closed position. Appropriate guide grooves or strips are preferably provided for this in the side walls. The volume of the container, defined by the space into which the waste bag can be placed, can be reduced by moving the base plate. During the movement, the third seal (also designated "seal on the base plate") seals the base plate, in any of its positions, airtight with respect to the side walls, in one of the embodiments described above, typically at least to prevent dirt from being able to penetrate under the base plate. When the container opening is closed, the container is therefore hermetically sealed by the side walls (these are also airtight) and either by the base plate or at least by the container bottom.

The container is designated airtight when, with the opening closed, the container holds an applied negative pressure of 500 mbar (absolute pressure inside) below 800 mbar (absolute pressure inside) for at least 30 minutes.

According to the invention, the container has an inlet port for compressed air, which, preferably controlled by an inlet valve, can be loaded with compressed air provided by the means for producing compressed air. Compressed air can thereby be injected into the inner space of the container, which is airtight. When a waste bag is placed over the container opening, and when it interacts with the first seal, either through the means for fastening a waste bag or through the second seal of the cover in the closed position, the space between the waste bag and the container is sealed airtight. Introducing compressed air into the space between the waste bag and the container and with the cover in the closed position, therefore causes compression and hence compaction of the contents of the waste bag. According to the invention, the device is preferably configured such that when it is used for the means for moving the base plate, the compressed air can be driven to the inlet port, also controlled by the inlet valve, and thereby into the interior of the container.

In order to fasten and move the base plate, the device according to the invention has means for moving the base plate with respect to the side walls. These means for moving the base pate are on one hand typically able to hold the base plate in the position of maximum extent of the volume of the container, in any case, they are able to move the base plate perpendicular to its surface, and with the cover in the closed position, in the direction of the cover or in the direction of the container opening such that the volume of the container can be reduced. The means for moving the base plate is capable in this case of moving the base plate in the direction of the container opening, preferably with a compression force of approximately 50 kPa to approximately 1000 kPa, preferably approximately 100 kPa to approximately 800 kPa, in particular approximately 300 kPa to approximately 600 kPa. With this force, when the cover is closed, the waste bag placed in one in the container with its contents can thereby be mechanically compressed. The possible extent of the movement of the base plate is preferably at least such that with the opening closed by the cover, the volume of the container, defined by the space into which the waste bag can be inserted, can be reduced by 50%, i.e. to 50% of the maximum extent, preferably by 70%, i.e. to 30% of the maximum extent. Suitable means for moving the base plate are for example screw rods, hydraulic cylinders, potentially with air, water or oil as a medium, preferably pneumatic cylinders or bellows. The latter pneumatic cylinders or bellows can advantageously be driven by the compressed air, which can be supplied by the means for producing compressed air contained in the device according to the invention. The movement means preferably comprise retraction elements, for example spiral springs. The retraction elements effect or assist retraction (away from the cover) of the base plate after completion of the mechanical compaction of the waste bag. The retraction forces are typically lower than the compression forces, preferably of approximately 50 kPa to approximately 500 kPa, preferably approximately 100 kPa to approximately 300 kPa. The means for moving the base plate is configured in this case such that it can deliver both the compression force specified above and the retraction force, therefore the sum of the two.

The device according to the invention furthermore has a cover. This is configured to cover the opening of the container, and for this purpose, has a second seal on the side, seal that interacts with the opening of the container. The cover is configured and arranged in the device so that it can be brought to an open position with respect to the opening of the container, so that the opening of the container is accessible for inserting a waste bag, and can be brought to a closed position with respect to the opening of the container so that the cover interacts positively with the opening of the container such that a waste bag placed inside the container can be sealed airtight against the cover between the first seal (at the container opening) and the second seal (on the cover). The extent of the second seal therefore substantially corresponds to that of the first seal, that is to say, substantially to that of the container opening. Therefore, if a waste bag is placed in the container and placed over the opening and hence over the first seal, the waste bag is clamped and sealed in the closed position between the first seal and the second seal and if applicable, the means for fastening a waste bag. The waste bag is thereby closed with the cover and the inside space of the bag is now only in contact with the cover (and the actual bag).

According to the invention, the cover has an aspiration opening, which is arranged on the cover such that in the closed position, the gaseous atmosphere can be at least partially aspirated from the interior of a waste bag placed inside the container by means of the means for producing negative pressure. As outlined above, the cover is configured so that the waste bag is clamped and sealed in the closed position of the waste bag between the first seal and the second seal and if applicable, the means for fastening a waste bag. The waste bag is therefore closed with the cover and the inside space of the bag is now only in contact with the cover (and the actual bag). The gaseous atmosphere can thereby be aspirated from the waste bag through the aspiration opening in the cover. The negative pressure required for this is provided by the means for producing negative pressure, as further defined below. A liquid sensor is preferably provided on the cover, next to the aspiration opening. The sensor ensures that in a case where liquids from the waste bag arrive or are aspirated on the cover, the aspiration process can be stopped to protect the components of the device against contamination.

The device according to the invention furthermore has means for producing compressed air. Suitable means, e.g. pumps or compressors are known in the prior art. The compressed air that can be produced preferably has at least $1.0*10^5$ Pa (100 kPa, 1 bar) excess pressure, preferably at least $2.0*10^5$ Pa (200 kPa, 2 bar) excess pressure. The compressed air can be introduced into the container space, through the inlet port, and can be used for the means for moving the base plate, insofar as these are means driven by means of air, for example pneumatic cylinders or bellows.

The device according to the invention furthermore has means for producing negative pressure. Suitable means, e.g. vacuum pumps, are known in the prior art. The negative pressure that can be produced is preferably at least $5.0*10^4$ Pa (50 kPa, 500 mbar) absolute pressure, preferably at least $2.0*10^4$ Pa (20 kPa, 200 mbar) absolute pressure. The vacuum pump must therefore be capable of producing an absolute pressure of 500 mbar, preferably 200 mbar, in the container inner space and hence in the waste bag. The negative pressure is used to aspirate the gaseous atmosphere from the waste bag. The device preferably has suitable means, e.g. a negative pressure hose for feeding the negative pressure to the cover and in particular to the aspiration opening in the cover. The means for producing negative pressure preferably comprise a filter, preferably a carbon filter, and/or a liquid sensor. The latter ensures that in the case where liquids are aspirated from the waste bag, the aspiration process can be stopped to protect the components of the device against contamination.

In one embodiment, the means for producing compressed air and the means for producing negative pressure are separate structural units, for example a compressor and a separate vacuum pump. In a preferred embodiment, the means for producing compressed air and the means for producing negative pressure are implemented in a means for producing compressed air and negative pressure, i.e. combined in one structural unit of the device according to the invention. For example, the exhaust air from a vacuum pump can be used directly as compressed air according to the invention. Preferably, the means for producing compressed air and negative pressure is a combined vacuum/compressed air pump. Suitable vacuum pumps, in which the exhaust air can also be used directly as compressed air, are known in the prior art, e.g. diaphragm pumps.

The device according to the invention furthermore has means for heat sealing a waste bag placed inside the container. The means can be located at the opening of the container and/or on the cover. Suitable means for heat sealing plastic bags, such as waste bags in PE (polyethylene), PP (polypropylene) or PLA (polyactide) are known in the prior art. Heat sealing means a process in which sheets of plastic film are first heated and then pressed together under pressure such that they are permanently bonded. Typical means for heat sealing are heating electrodes, in particular strip electrodes as known in the prior art and commercially available. Kanthal strip or wire is typically used. Depending on the process, appropriate sealing temperatures are used, potentially within a range of 80 °C to 140 °C, e.g. approximately 80 °C for thermoplastic materials like PP and PE, up to 140 °C for PLA film. Appropriate sealing times are from approximately 0.1 to 5 seconds, preferably approximately 0.5 to 3 seconds. The sealing time is preferably temperature-controlled, with temperature control determined, as known in the prior art, through the electrical resistance of the Kanthal strip or wire. This ensures sufficient durability for a complete, tight seal.

Suitable parameters, such as for example specifying the dimensions of the Kanthal strip or wire and the power supply for heat sealing plastic film are known in the prior art. The Kanthal strip or wire is preferably coated with a PTFE layer to prevent the plastic film from sticking. The means located at the opening of the container and/or on the cover, are arranged such that, when the cover is in the closed position, a waste bag stretched over the opening of the container can be closed and sealed with an appropriate part of the bag, for example a turned down flap of the bag, or a separate part, when the flap or separate part is placed over the opening. The heat sealing means, in particular the strip electrodes, are preferably arranged substantially parallel to the first and second seals, either respectively on the cover and/or at the container opening. The heat sealing means in this case are preferably arranged fully circumferentially around the container opening in order to ensure complete sealing of the waste bag. This can be achieved by heat sealing means, in particular the strip electrodes, which are arranged on the cover, substantially parallel to the second seal, or at the container opening, substantially parallel to the first seal, respectively fully circumferentially (around the container opening). Insofar as the heat sealing means, in particular the strip electrodes, are arranged both partly on the cover, substantially parallel to the second seal and also partly at the container opening, substantially parallel to the first seal, it is sufficient and preferable that the means are arranged together, substantially fully circumferentially around the container opening, therefore together ensuring a full circumference. A full circumference is guaranteed when there is at least little overlap of the opposing means, that is to say on one hand on the cover substantially parallel to the second seal and on the other at the container opening, substantially parallel to the first seal. This ensures complete sealing of the waste bag. Regarding the first and the second seal, the heat sealing means, in particular the strip electrodes, are preferably arranged within the respective area encompassed by the seals.

In one embodiment, the device according to the invention has means for detaching the separate parts of a film, with which the opening of the container and hence the waste bag placed inside are covered. Such means, for example a cutting or tearing edge, preferably a cutting electrode, are known in the prior art. The latter are substantially the same electrodes as those used as described above for sealing, only the sealing time and/or temperature is increased so that the foil material is cut. Typical temperatures are approximately 140 °C to approximately 150 °C for a time of approximately 1.5 to 3 seconds.

The device according to the invention is essentially suitable for use with different waste bags, heat-sealable plastic bags, such as waste bags in polyolefines, such as PE (polyethylene) and PP (polypropylene) and in polyesters such as PLA (polyactide), are preferable for use with the device according to the invention and in the process according to the invention. Heat-sealable plastic bags made of biodegradable PLA films, such as those known in the art and commercially available (for example "Planova PLA 50" from SÜDDPACK Verpackungen GmbH & Co. KG, Ochsenhausen, Germany), are preferably used. The raw materials of the waste bag films are preferably compostable in accordance with EN 13432.

In a preferred embodiment, the device according to the invention furthermore has means on the cover for perforating a waste bag. These are arranged typically inside the area encompassed by the second seal, in particular on the cover, so that perforation can take place within the area encompassed by the second seal. The means are also typically arranged outside the area encompassed by the heat sealing means. As soon as a waste bag stretched over the opening of the container, is closed by an appropriate part of the bag, for example a turned down flap of the bag, or a separate part, when the flap or the separate part are placed over the opening, according to the invention, mechanical compression takes place and/or compressed air in the container is compressed and/or the gaseous atmosphere is aspirated from the interior of the bag, in order to compress the waste bag. However, since the waste bag has already been closed by pressing onto it an appropriate part of the bag, for example a turned down flap of the bag or a separate part, by placing the flap or separate part over the container opening, and has been pressed into the closed position by means of the cover and the second seal, air can no longer escape from the interior of the bag. For this purpose, a defined "outlet port" is made on the waste bag by the means for perforating a waste bag, preferably on the closing tab, i.e. for example a turned down flap of the bag or on the separate part. Suitable means for perforating a waste bag are for example one or more spikes or cutting edges. The use of the means for perforating a waste bag can preferably be controlled, therefore not permanently active, preferably able to be electrically activated. For example, this involves one or more electrically extendable spikes or one or more electrically extendable cutting edges, which then retract again. This can be activated before a compression or aspiration step. A subsequent retraction of the means has the advantage of a reduced risk of injury when changing the waste bag. In a preferred embodiment, the means for perforating a waste bag is arranged in the aspiration opening or perforated through the aspiration opening.

In a preferred embodiment, the device according to the invention comprises means for fastening the closing tab of the waste bag. A corresponding part of the bag, for example a turned down flap of the bag or a separate part, is placed over the container opening before aspiration or sealing of the waste bag. In order to prevent any slippage of this part, designated here as closing tab, the device according to the invention comprises means for fastening the closing tab of the waste bag, typically one or more clamps or clamping strips. These are preferably positioned on the front side of the container e.g. under the container opening. The means for fastening the closing tab of the waste bag, typically one or more clamps or clamping strips, preferably interacts with spikes for fastening the closing tab of the waste bag. The latter are for example accordingly also positioned on the front side of the container, under the container opening. Circuit breakers are preferably also provided, for example also on the front side of the container, just below the container opening, which are arranged so that they interact with the closing tab of the waste bag, e.g. they are triggered by contact with same. The circuit breakers thus make it possible to check whether the closing tab of the waste bag has been correctly fitted. Only in the latter case should a sealing or cutting step take place.

In a preferred embodiment, the device according to the invention furthermore has means on the cover for irradiating the interior of the container with UV light (380 to 100 nm), in particular UV-C light (280 to 100 nm). Irradiating waste with UV light, in particular UV-C light, reduces and inactivates harmful microorganisms, thereby reducing decay and other metabolic processes, and therefore prevents odours from forming. Suitable light means for producing UV light, in particular UV-C light are known in the prior art, for example UV LEDs. The cover preferably also comprises a protection device for the means for irradiating the interior of the container, in particular in the event of non-use. Suitable protection means could potentially be a rotating or swivelling dimmer or shading of the UV lamp located on the cover. During mechanical compression of the waste bag, the cover acts as a counter-pressure surface. The protection device is therefore preferably configured such that it moves in front of the means for irradiating the interior of the container, for example folds out or remains folded out, and folds back during irradiation, preferably only during irradiation, thereby releasing the radiation path into the interior of the container. The folded-out protection device preferably substantially forms a plane with the face of the cover, which is oriented in the container direction. Both contamination and also damage to the irradiation means can be prevented by the protection device, in particular during compression.

The present invention furthermore relates to a process for collecting and compacting waste comprising a) the step of aspirating part of the gaseous atmosphere from a waste bag that contains waste, with b) simultaneous mechanical compression of the waste bag and c) simultaneous external air pressure loading of the waste bag. According to the invention, three means are therefore used to reduce the volume of waste, firstly aspirating the gaseous atmosphere from the waste bag, secondly mechanical compression to assist the removal of the gaseous atmosphere and above all enabling greater pressure on the waste, since during aspiration, only the 1 bar ($10^5$ Pa) pressure of the air column is acting, and finally thirdly, action of compressed air on the outside of the waste bag. The latter thus allows pressure "from all directions". According to the invention, these measures a), b) and c) are performed simultaneously at least at one point in the process.

The pressures used in the process steps a), b) and c) preferably correspond to those specified for the device described above. So, in step a), a negative pressure is produced preferably of at least $5.0*10^4$ Pa (50 kPa, 500 mbar) absolute pressure, preferably at least $2.0*10^4$ Pa (20 kPa, 200 mbar) absolute pressure. In step b), the waste bag is preferably mechanically loaded with a compression force of approximately 50 kPa to approximately 1000 kPa, more preferably approximately 100 kPa to approximately 800 kPa, in particular approximately 300 kPa to approximately 600 kPa. In step c), the waste bag is preferably loaded with compressed air of at least $1.0*10^5$ Pa (100 kPa, 1 bar) excess pressure, preferably at least $2.0*10^5$ Pa (200 kPa, 2 bar) excess pressure. The device according to the invention is preferably configured to allow these pressures for steps a), b) and c), in particular simultaneously.

During the process according to the invention, a first step, in which the waste bag is only mechanically compressed, preferably followed by additional aspiration of a first part of the gaseous atmosphere from a waste bag, i.e. without compressed air loading, is performed before the steps a), b) and c) of simultaneous aspiration, mechanical compression and atmospheric pressure loading, that is to say before the step of aspirating part of the gaseous atmosphere from a waste bag that contains waste, with simultaneous mechanical compression of the waste bag and atmospheric pressure loading of the waste bag from outside. According to the invention, the waste bag is preferably first mechanically compressed, then preferably additionally aspirated, before most of all preferably, atmospheric pressure loading of the waste bag still also takes place.

During the process according to the invention, preferably before the step of aspirating part of the gaseous atmosphere from a waste bag that contains waste, with simultaneous mechanical compression of the waste bag and atmospheric pressure loading of the waste bag from outside, the waste bag is closed and sealed by means of a "part of the waste bag or a separate part of the waste bag" (simply designated "part" in places), by pressing on the part. Since no more air could now escape from the waste bag, the closing tab is perforated at one point, as described above. The gaseous atmosphere can now escape through the perforation opening and if necessary, part of the gaseous atmosphere can be aspirated from the waste bag.

Following reduction of the waste volume by compression and aspiration according to the invention, a step typically follows of sealing the waste bag by heat sealing with the closing tab, preferably during or (immediately) after aspirating part of the gaseous atmosphere from the waste bag.

According to the invention, as described in detail above, the device according to the invention can advantageously be used for the process according to the invention, the process according to the invention is therefore carried out using the device according to the invention as described above. In particular, the moving base plate allows mechanical compression of the waste bag, wherein it can be moved with respect to the side walls in the direction of the cover, which is in the closed position, and the volume of the container can thus be reduced. Then, preferably while maintaining the mechanical compression pressure from the base plate, a part of the gaseous atmosphere can be aspirated through the cover from a waste bag that contains waste. Finally, compressed air, supplied by the means for producing compressed air, is injected, preferably while maintaining the compression pressure from the base plate and/or maintaining aspiration, through the inlet port of the container, for example controlled by an inlet valve, and the waste bag is therefore additionally compressed. Maximum compression of the waste is thereby achieved. The waste in the waste bag can finally be shrink-wrapped and disposed of.

BRIEF DESCRIPTION OF THE DRAWINGS

The invention is now described on the basis of the drawings.

DETAILED DESCRIPTION

Figure 1:
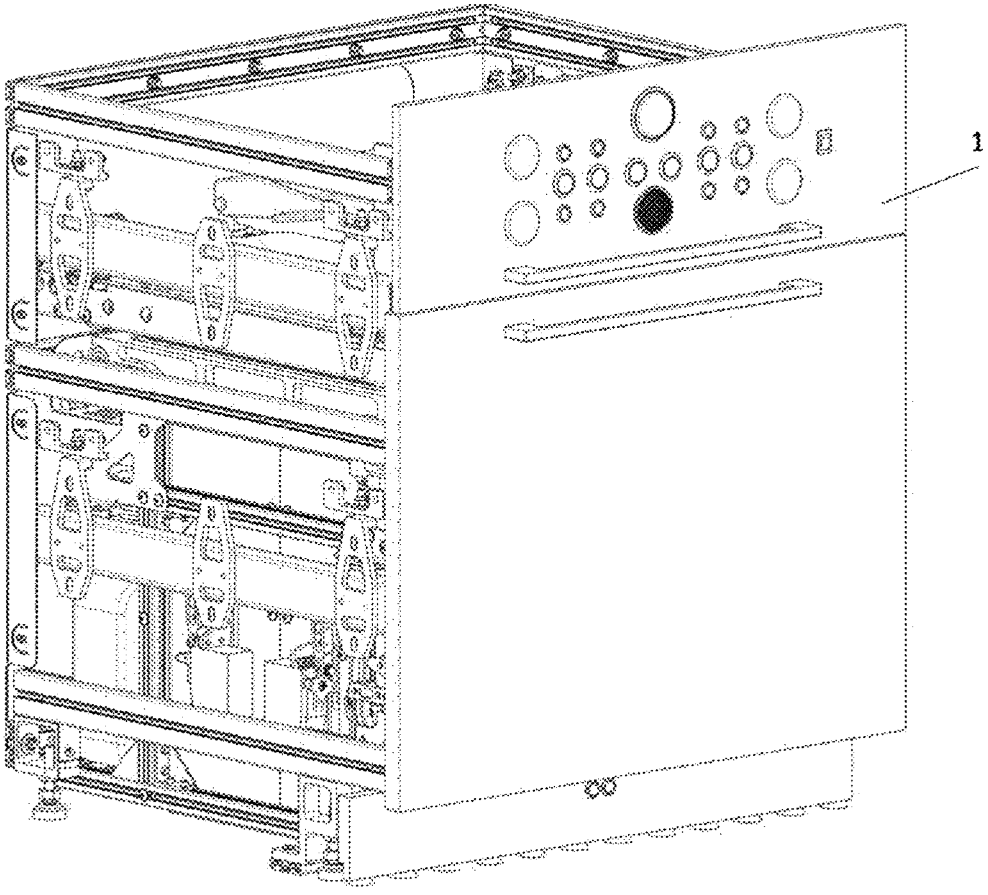
FIG. 1 shows a schematic view of a device according to the invention.

A device (1) according to the invention is shown in FIG. 1, embodied here as a base unit with a front panel, control element and base board, e.g. suitable as a kitchen unit. The extendable middle part, fastened by the side pull-out runners, comprises the container unit, the upper part with the control elements comprises the cover unit, which is preferably also designed to be pulled out for operating purposes.

Figure 2:
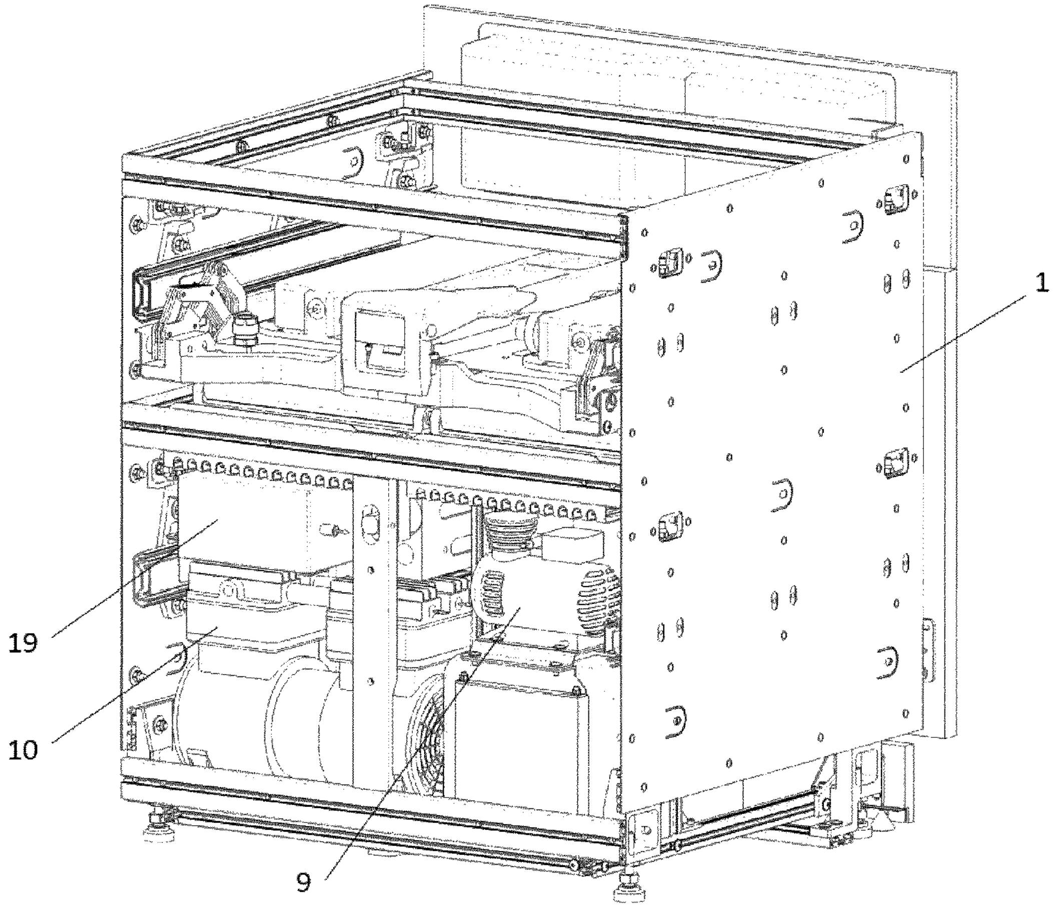
FIG. 2 shows a schematic view of the rear side of a device according to the invention.

FIG. 2 shows a device (1) according to the invention from the rear side, here also designed as a base unit with a front panel and base board, e.g. suitable as a kitchen unit. From the rear side, the means (9) for producing compressed air, shown here as a compressor, can be seen as well as the means (10) for producing negative pressure, shown here as a vacuum pump. These means are both disposed in the container unit. The activated carbon filter (19) here is mounted above the vacuum pump. The pressure/negative pressure lines are not shown.

Figure 3:
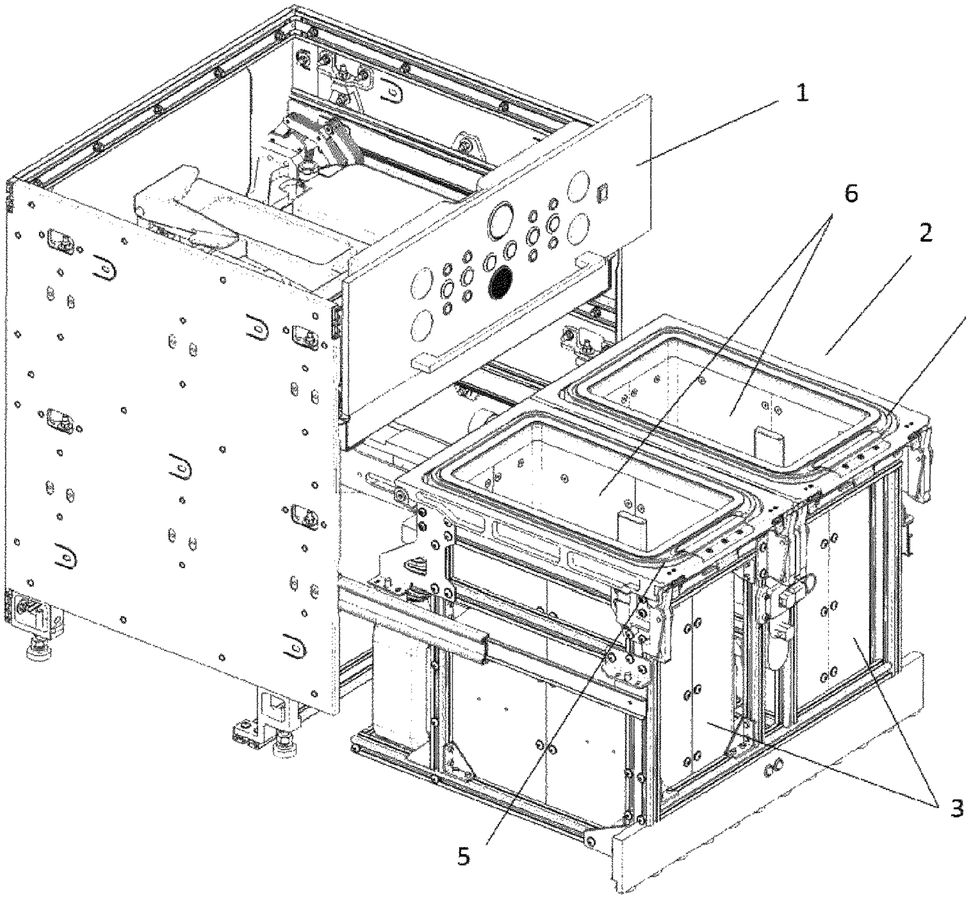
FIG. 3 shows a schematic view of a device according to the invention with extended containers.

FIG. 3 shows a device (1) according to the invention as shown in FIG. 1, designed as a base unit with a base board and control element, e.g. suitable as a kitchen unit. The front panel is not shown. The central part, which comprises the container unit, is shown pulled out by means of the side pull-out runners. The upper part, with the control elements, which comprises the cover unit, is shown in the retracted position. The container unit comprises two containers (2) with the respective side walls (3) and openings (6). The first seal (5) is provided at the opening of each container.

Figure 4:
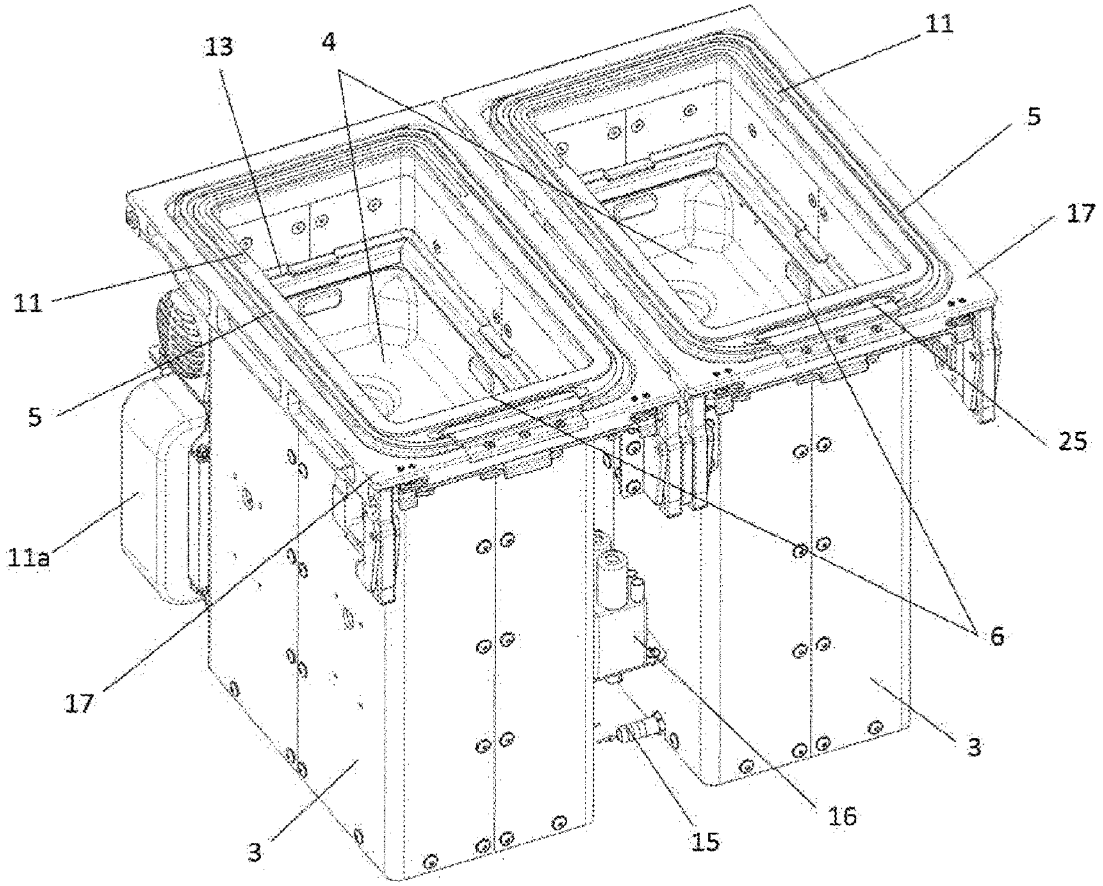
FIG. 4 shows a schematic view of two containers of a device according to the invention.

FIG. 4 shows a detail view of the containers of the device (1) according to the invention. The containers are substantially formed from the side walls (3) and the container bottom (not visible here). The moveable base plates (4) are located inside the containers. The first seal (5) is provided at the opening (6) of each container. The heat sealing means (11) are embodied as strip electrodes at the openings (6), but only over approximately one third of the circumference of the openings (6). The corresponding electrodes on the cover, not shown here (see FIG. 12) complete the heat sealing means (11) over the entire circumference around the openings. This ensures that the waste bag is completely sealed during sealing. Alternatively, the strip electrodes can also be disposed fully circumferentially around the container opening. The control unit (11*a*) for the heat sealing means powers the heat sealing means (11) at the opening (6) or cover (7). The seal (13) on the base plate (also designated "third seal") seals the base plate (4) at all of its positions with respect to the side walls (3), airtight in an embodiment described in detail above, preferably at least so as to prevent dirt from possibly being able to penetrate under the base plate (4). When the container opening (6) is closed, the container is thus hermetically sealed by the side walls (3) (these are also made to be airtight) and either by the base plate (4) or at least by the container bottom (18) (not shown here, see FIG. 9 for example). Compressed air can enter the interior of the container through the inlet port (15), via the controlled compressed air inlet valve (16). This compressed air is used to compress the waste in the waste bag arranged inside the container (and above the base plate), when the cover is in the closed position and the waste bag presses against the first seal (5). If the seal (13) is made to be airtight, the compressed air is injected into the inner space of the container above the base plate. The fastening means (17), designed here as clamping frames and shown in the closed position, surrounds the opening (6) on the outside and, when a waste bag (not shown here) is placed inside (with the clamping frames open), can clamp the latter and thereby fasten it to the container. The fastening means (17) only partially covers the seal (5), here in the figure at the end of the opening (6) shown at the front. In this region, the fastening means (17) according to a preferred embodiment of the present invention, is used to form a recess for perforation (25). A waste bag placed inside with the clamping frames (17) open is clamped over the first seal (5) by means of the clamping frame. Without the perforation recess (25), which is preferably formed by the clamping frames while covering the first seal (5), the closing tab (part of the waste bag or a separate part) and the waste bag would lie directly over each other when covering the waste bag for sealing, so that the closing tab could not be perforated or could only possibly be selectively perforated by the perforation means (21). The perforation recess (25) therefore protects the waste bag against the perforation means (21), and so the latter can only perforate the closing tab in order to aspirate the gaseous atmosphere and/or to allow the gaseous atmosphere to escape from inside the waste bag. This is described in more detail with FIG. 17.

Figure 5:
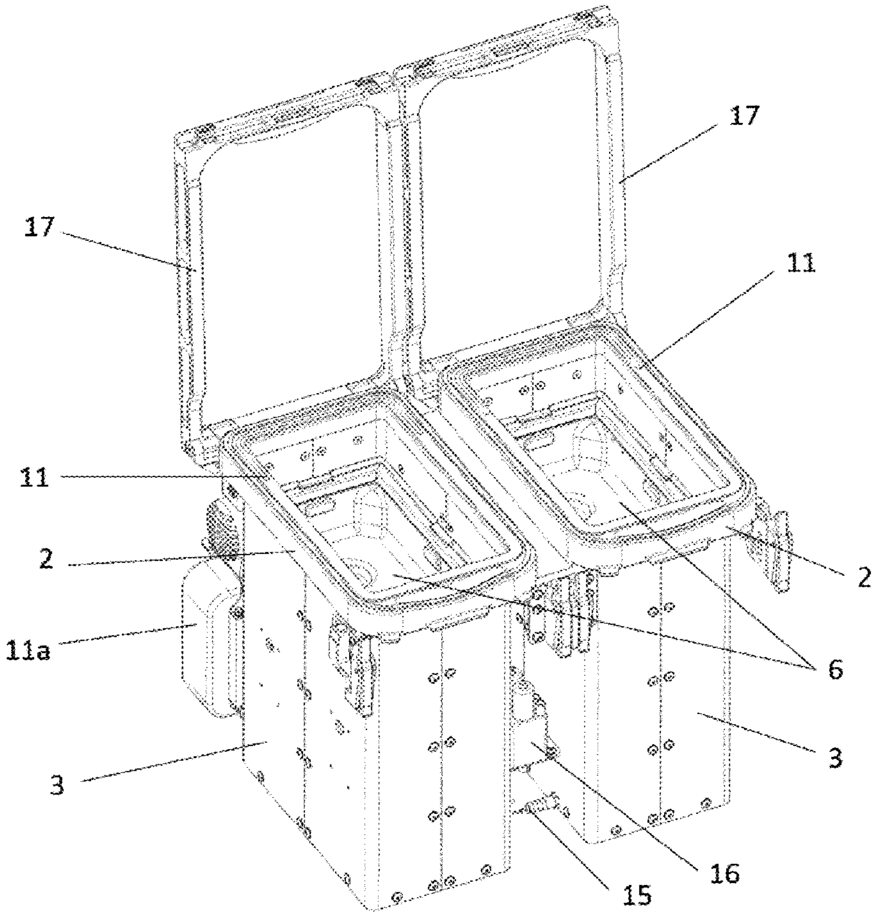
FIG. 5 shows a schematic view of two containers of a device according to the invention with open clamping frames.

FIG. 5 shows a detail view of the container (2) of the device (1) according to the invention corresponding to FIG. 4, except that the fastening means (17) designed here as clamping frames is shown in the open position. In this position, a waste bag (not shown here) can be placed inside the container through the opening (6).

Figure 6:
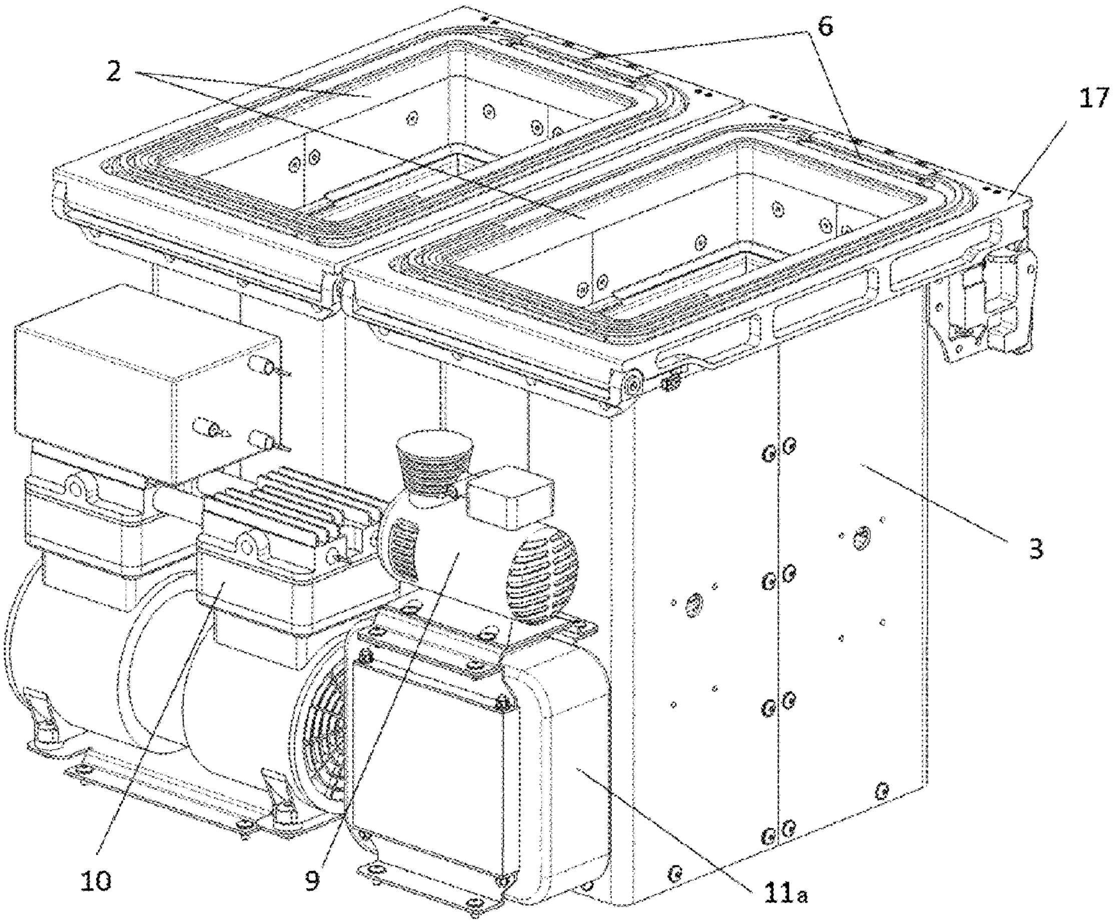
FIG. 6 shows a schematic view of the rear side of two containers of a device according to the invention.

FIG. 6 shows a detail view of the container (2) of the device (1) according to the invention from the rear side. The containers (2) comprise the side walls (3) and the container bottom (not visible here) and have the openings (6). The fastening means (17), designed here as clamping frames and shown in the closed position, surround the opening (6) on the outside and when a waste bag (not shown here) is placed inside (with the clamping frames open), can clamp the latter and thereby fasten it to the container. In order to use the space in the device (1) according to the invention advantageously, particularly when the device is configured as a base unit, e.g. suitable as a kitchen unit, the means (9) for producing compressed air, shown here as a compressor and the means (10) for producing negative pressure, shown here as a vacuum pump, are arranged in the container unit of the device behind the containers. The activated carbon filter (19) here is mounted above the vacuum pump. The control for the heat sealing means (11*a*) is arranged below the compressor.

Figure 7:
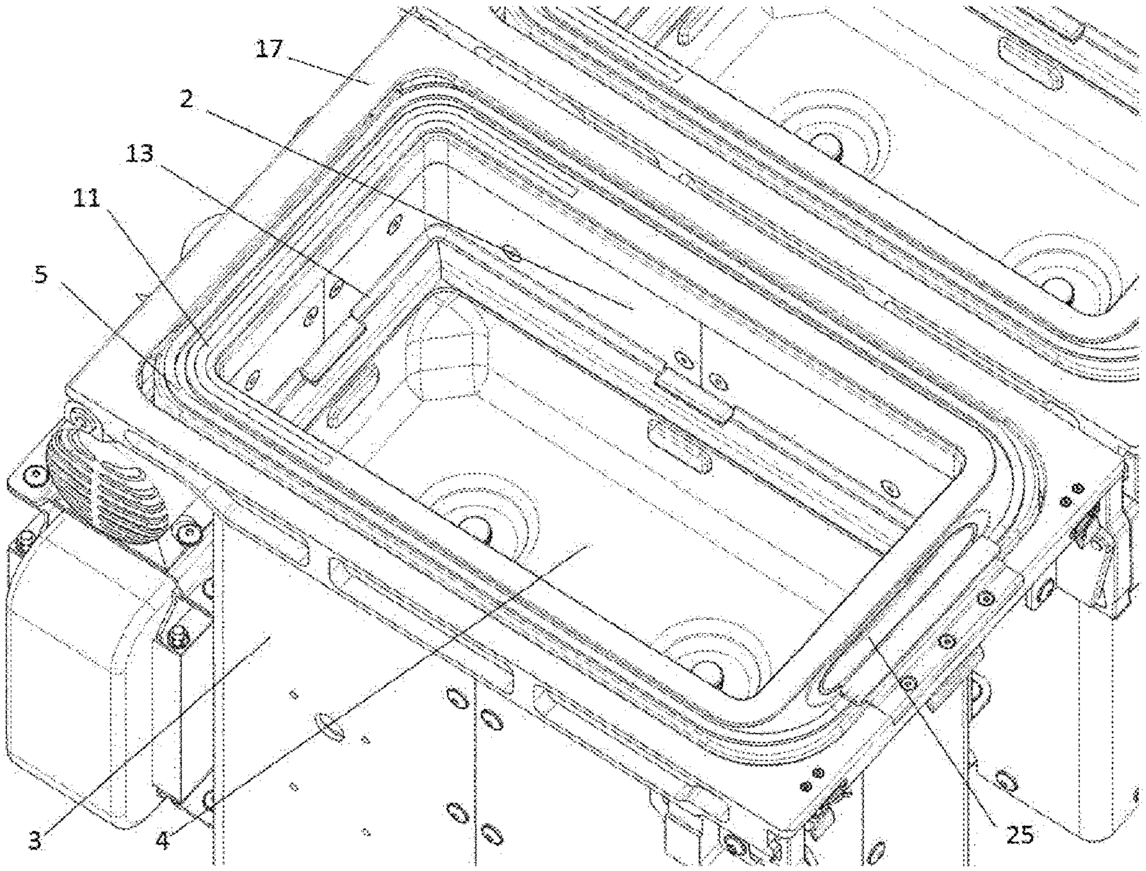
FIG. 7 shows a detail view of two containers of a device according to the invention.

FIG. 7 shows a detail view of the inside of a container (2) of the device (1) according to the invention. The region of the container (2) into which the waste bag can extend is limited by the side walls (3) and the moveable base plate (4), shown here in the "high extension" position. The first seal (5) is disposed at the opening (6) of the container, together with the heat sealing means (11). The seal (13) on the base plate seals the base plate (4) with respect to the side walls (3), either airtight, or preferably at least so as to prevent dirt from possibly penetrating under the base plate (4). The fastening means (17) only partially covers the first seal (5), here at the end of the opening shown at the front in the figure. In this region, according to a preferred embodiment of the present invention, the fastening means (17) is also used to form the perforation recess (25).

Figure 8:
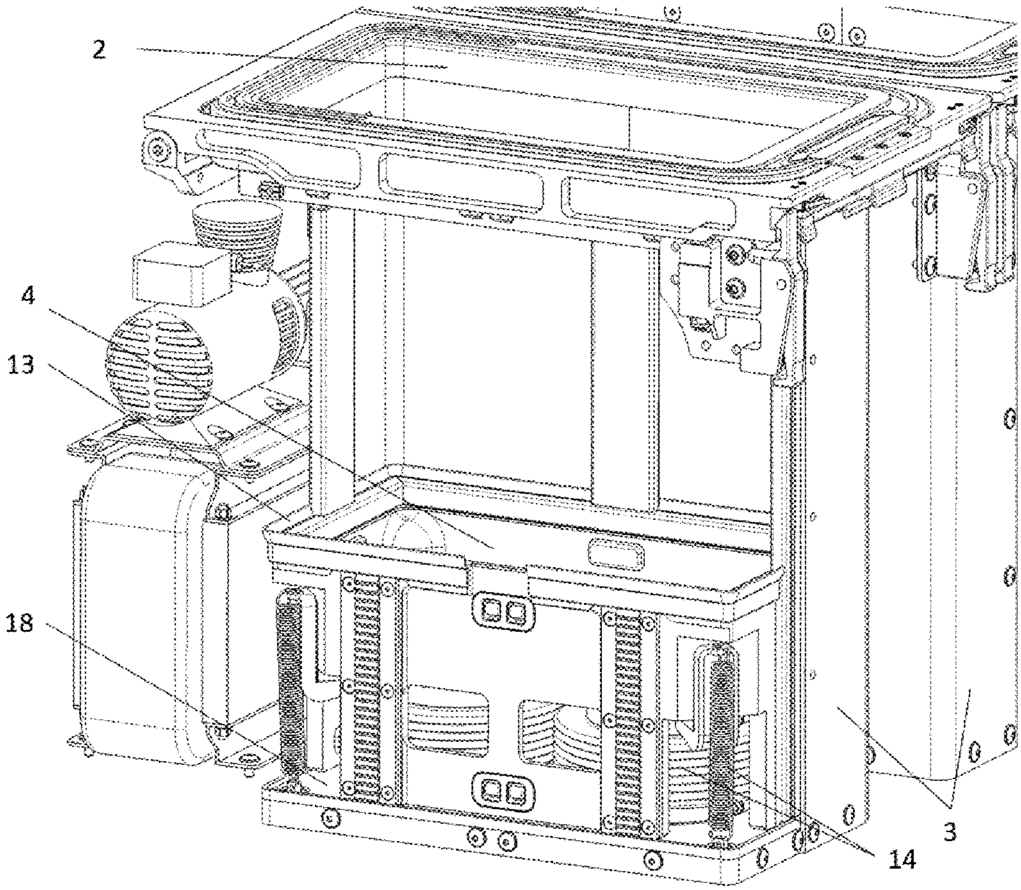
FIG. 8 shows a schematic view of two containers of a device according to the invention without the container side wall.

FIG. 8 shows a detail view of the inside of a container (2) of the device (1) according to the invention. The containers are substantially formed from the side walls (3) (the front side wall is not shown) and the container bottom (18). The region of the container (2) into which the waste bag can extend is limited by the side walls (3) and the moveable base plate (4), shown here in the "lowered" position. The seal (13) on the base plate seals the base plate (4) with respect to the side walls (3), either airtight, or preferably at least so as to prevent dirt from possibly penetrating under the base plate (4). The means (14) for moving the base plate according to the invention preferably comprises sliding elements, formed here as bellows, which can push the base plate (4) in the direction of the cover, as well as retraction elements, designed here as spiral springs.

Figure 9:
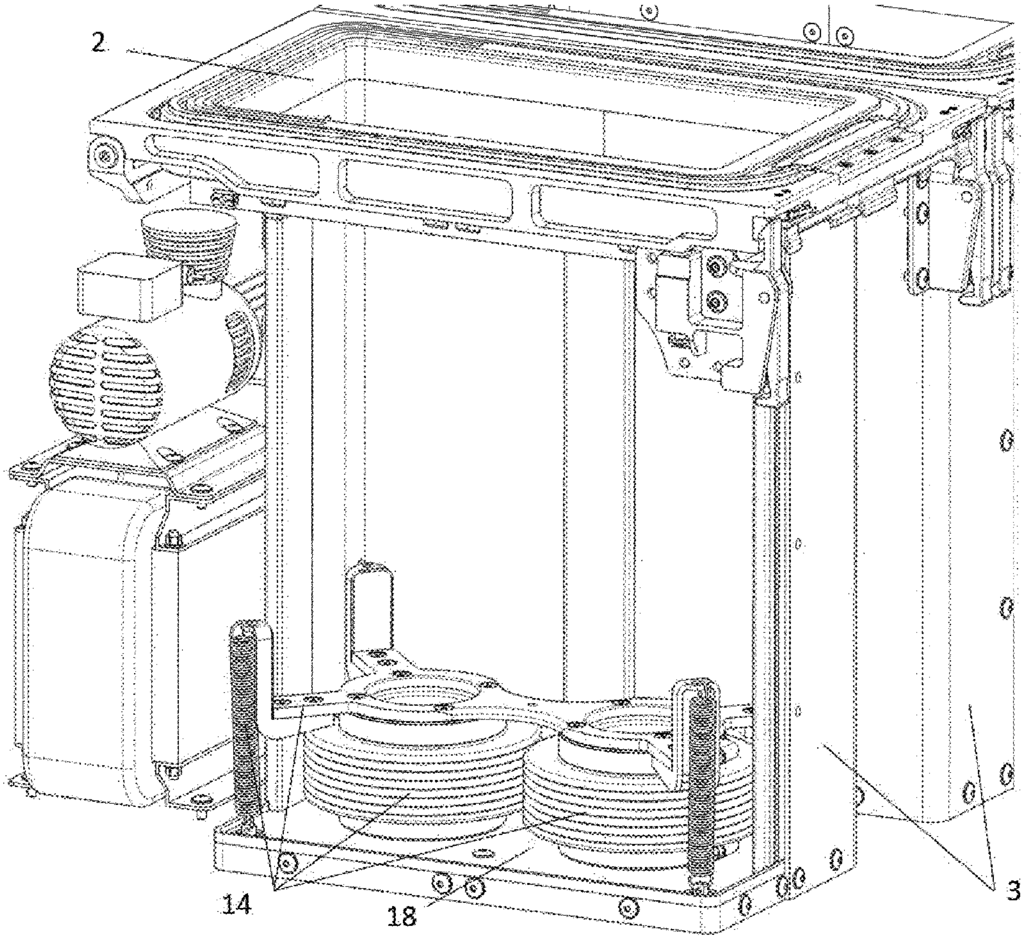
FIG. 9 shows a schematic view of two containers of a device according to the invention without the container side wall and without the base plate.

FIG. 9 shows a detail view corresponding to FIG. 8 of the inside of a container (2) of the device (1) according to the invention. The containers are substantially formed from the side walls (3) (the front side wall is not shown) and the container bottom (18). Compared with FIG. 8, the base plate (4) is not shown. The means (14) for moving the base plate, shown here in the "lowered" position, according to the invention preferably comprises sliding elements, formed here as bellows which are connected by a holder, and which can push the base plate (4) in the direction of the cover, as well as retraction elements, designed here as spiral springs.

Figure 10:
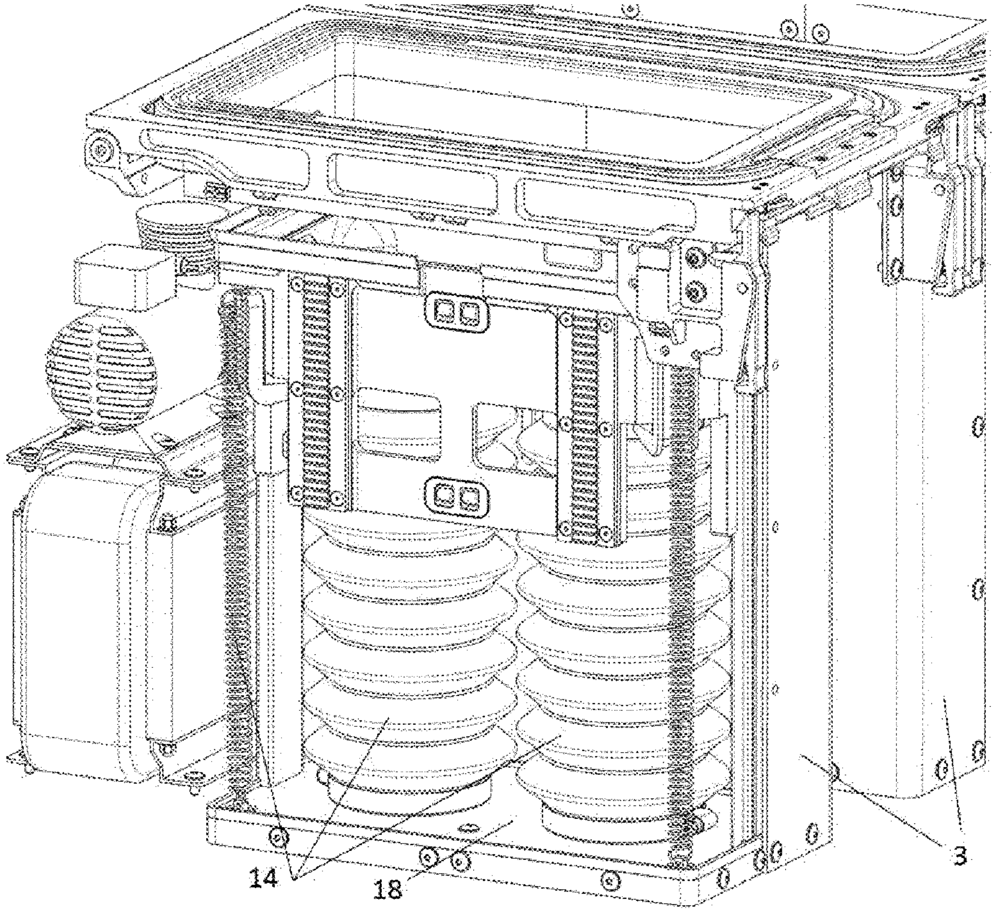
FIG. 10 shows a schematic view of two containers of a device according to the invention without the container side wall with means for moving the base plate extended.

FIG. 10 shows a detail view corresponding to FIG. 8 of the inside of a container (2) of the device (1) according to the invention, however, the moveable base plate (4) is brought to the "high extension" position by the means (14) for moving the base plate. The means (14) for moving the base plate preferably according to the invention comprises sliding elements, formed here as bellows, which can push the base plate (4) in the direction of the cover, as well as retraction elements, designed here as spiral springs. The latter are tensioned in the "high extension" position and allow the base plate to retract, for example after emptying the container, i.e. after removing the compressed and sealed waste bag.

Figure 11:
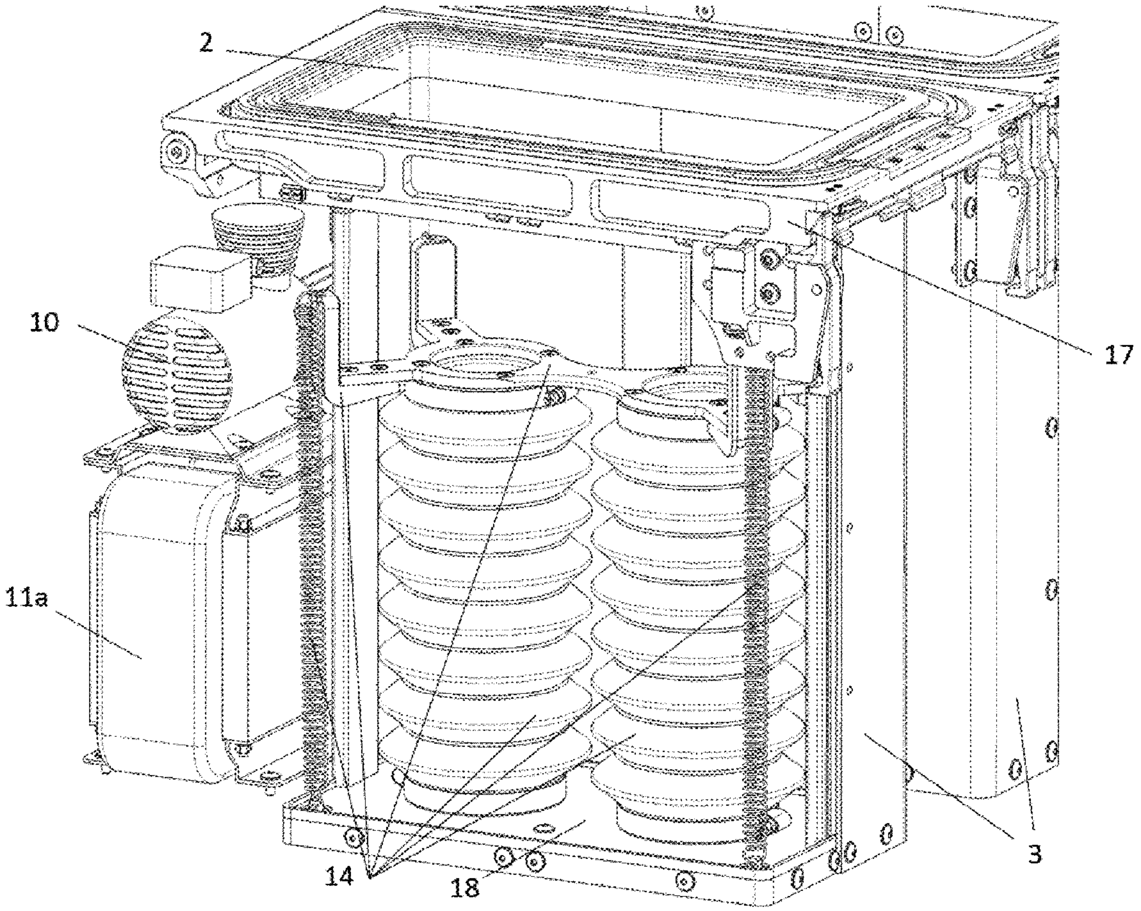
FIG. 11 shows a schematic view of two containers of a device according to the invention without the container side wall with means for moving the base plate extended without the base plate.

FIG. 11 shows a detail view corresponding to FIG. 10 of the inside of a container (2) of the device (1) according to the invention. The means (14) for moving the base plate is shown in the "high extension" position, the base plate is not shown.

Figure 12:
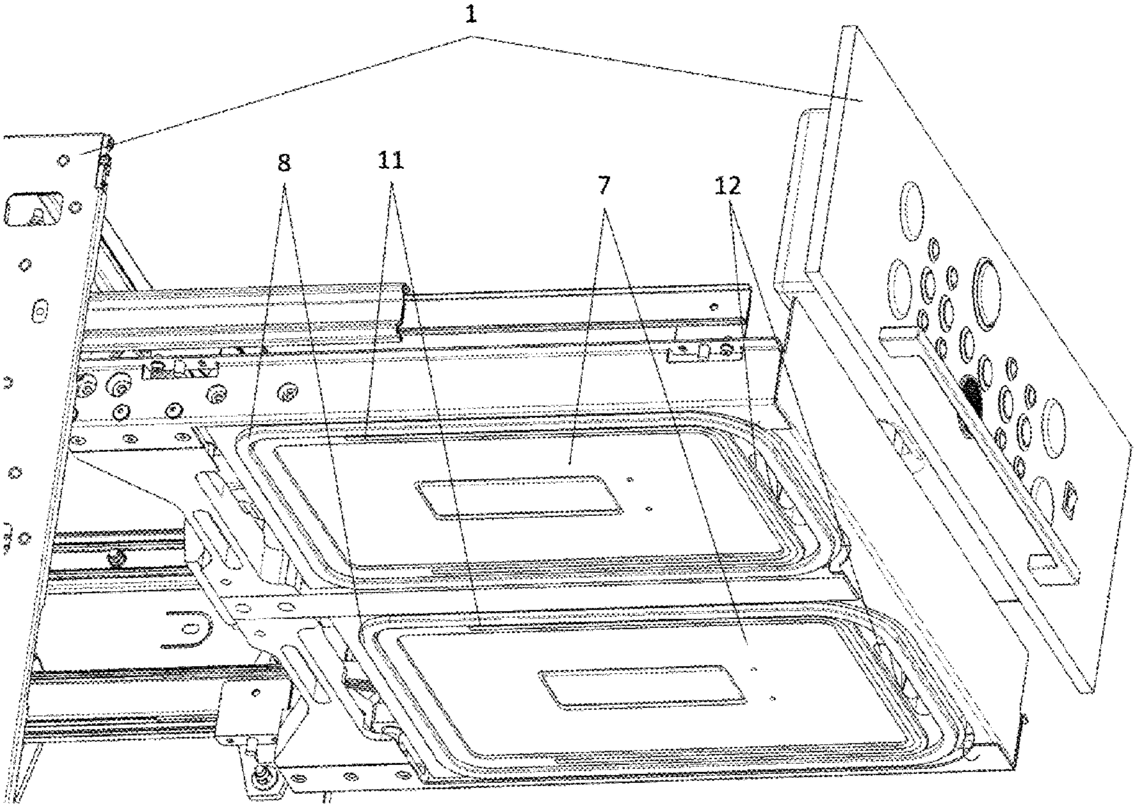
FIG. 12 shows a schematic view of two covers of a device according to the invention in extended position.

FIG. 12 shows a detail view of the covers (7) of the device (1) according to the invention, here in the position extended by means of the pull-out runners (for operating purposes). The covers (7) comprise the second seal (8) on the cover, which interacts with the first seal (5) at the container opening (not shown here) in the closed position. The heat sealing means (11) are designed as strip electrodes, but only over approximately two thirds of the circumference of the opening. The corresponding electrodes at the container opening, not shown here (see FIG. 4 for example), complete the heat sealing means (11) for a full circumference around the opening. This ensures complete sealing of the waste bag during sealing. The atmosphere can be aspirated from the waste bag through the aspiration openings (12).

Figure 13:
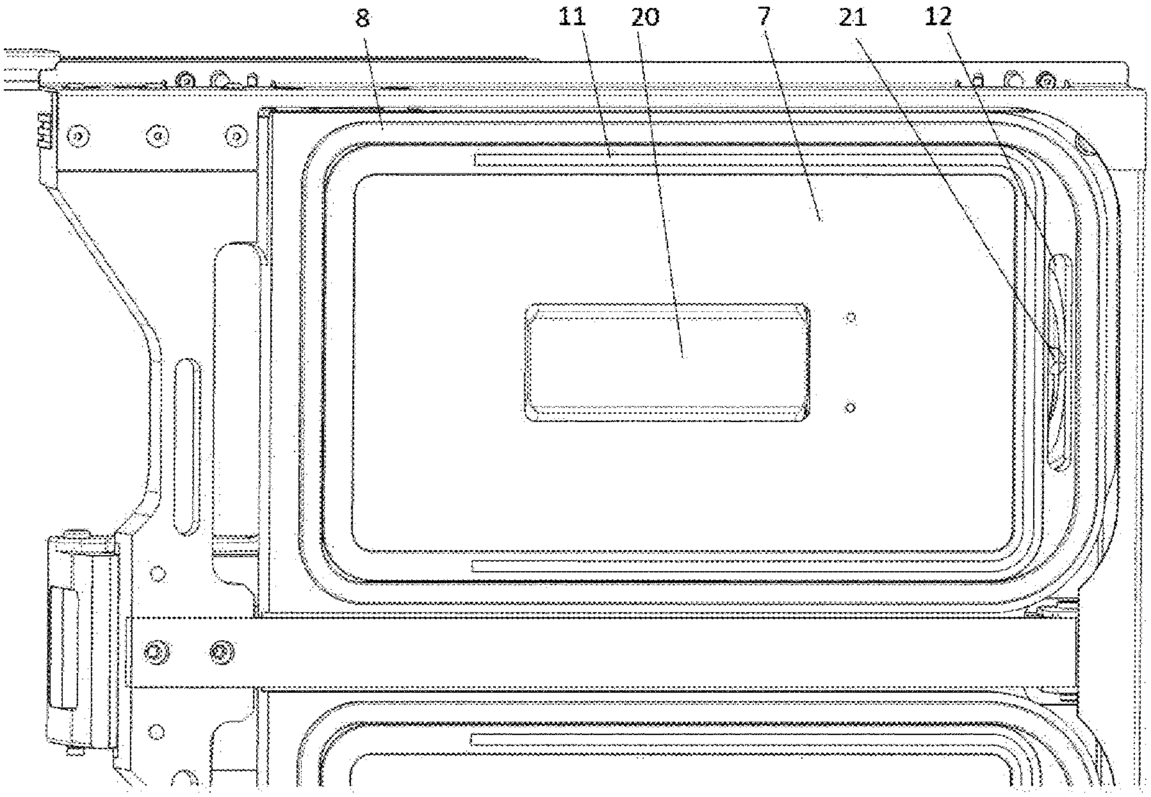
FIG. 13 shows a detail view of two covers of a device according to the invention.

FIG. 13 shows a detail view of the covers (7) of the device (1) according to the invention illustrated here from below from the direction of the container. The covers (7) comprise the second seal (8) on the cover, that interacts in the closed position with the first seal (5) at the container opening (not shown here). The heat sealing means (11) are designed as strip electrodes, but only over approximately two thirds of the circumference of the opening. The atmosphere can be aspirated from the waste bag through the aspiration opening (12). The aspiration opening (12) also accommodates the perforation means (21). The protection device (20) can be folded away during operating, and thereby gives the irradiation means, typically a UV lamp, optical access to the interior of the container. The light from the UV lamp can therefore reach the interior of the container as soon as the protection device (20) has been moved aside, e.g. rotated or pushed. In the closed position, the protection device (20) substantially forms a plane with the side face of the cover (7), which, in the closed position, is oriented in the container direction.

The covers (7) of the device (1) according to the invention remain in the retracted position during normal operation of the device, as shown in FIGS. 1 and 3. In order to place waste in the waste bag, the container unit is typically extended as shown in FIG. 3, and retracted again as shown in FIG. 1 after placing the waste inside. In the retracted position, the cover (7) with the second seal (8) is normally lowered, so that the second seal (8) interacts, in the closed position, with the first seal (5) at the container opening, and the waste bag is sealed by the cover (7). This prevents unpleasant odours due to the waste, and for this purpose, after the container unit has been retracted, the waste can additionally be irradiated with UV light by the means on the cover for irradiating the interior of the container. In one embodiment, irradiation takes place at every retraction of the container unit after placing the waste inside and/or part of the atmosphere has been aspirated from the rubbish bag.

Figure 14:
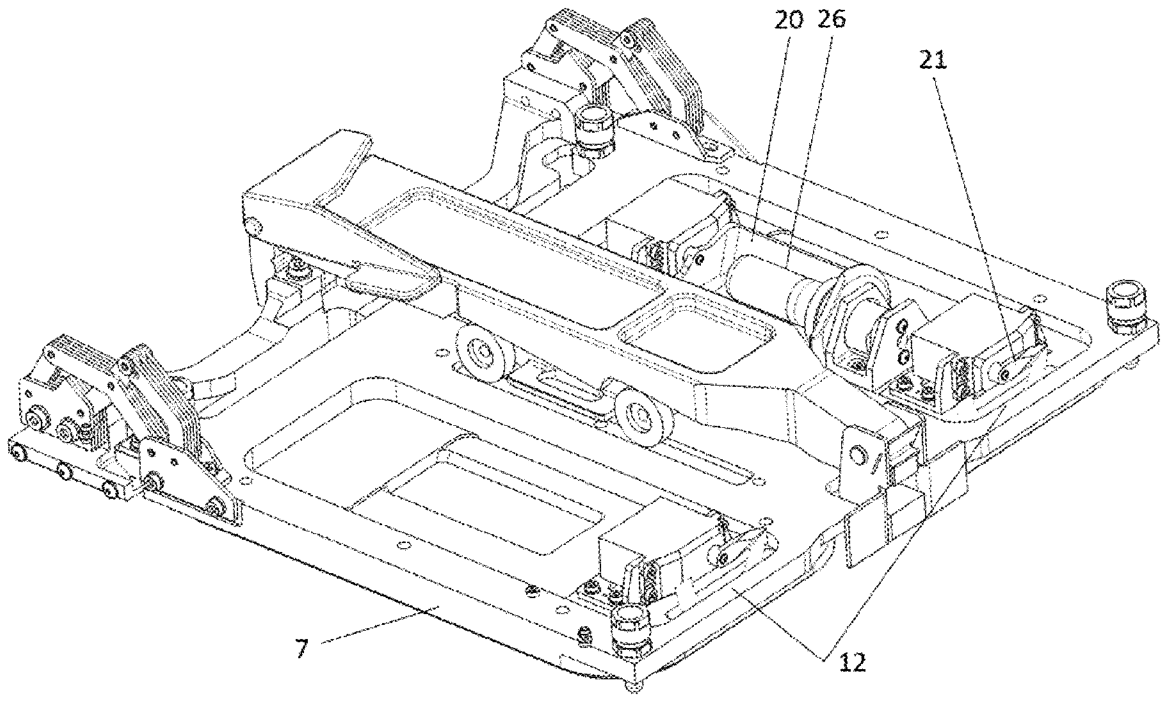
FIG. 14 shows a detail view of two covers of a device according to the invention from the rear side.

FIG. 14 shows a detail view of the covers (7) of the device (1) according to the invention, illustrated here from above. The atmosphere can be aspirated from the waste bag through the aspiration opening (12). The housing, which normally encloses the aspiration opening, the UV lamp (26) and the protection device (20), is not shown. The waste bag can be perforated through the aspiration opening (12) by the perforation means (21), shown here as a blade, which leaves a semi-circular cut region. On the cover shown in the foreground, the UV lamp (26) and the protection device (20) are not visible, only the opening normally filled by the protection device (20) is shown.

Figure 15:
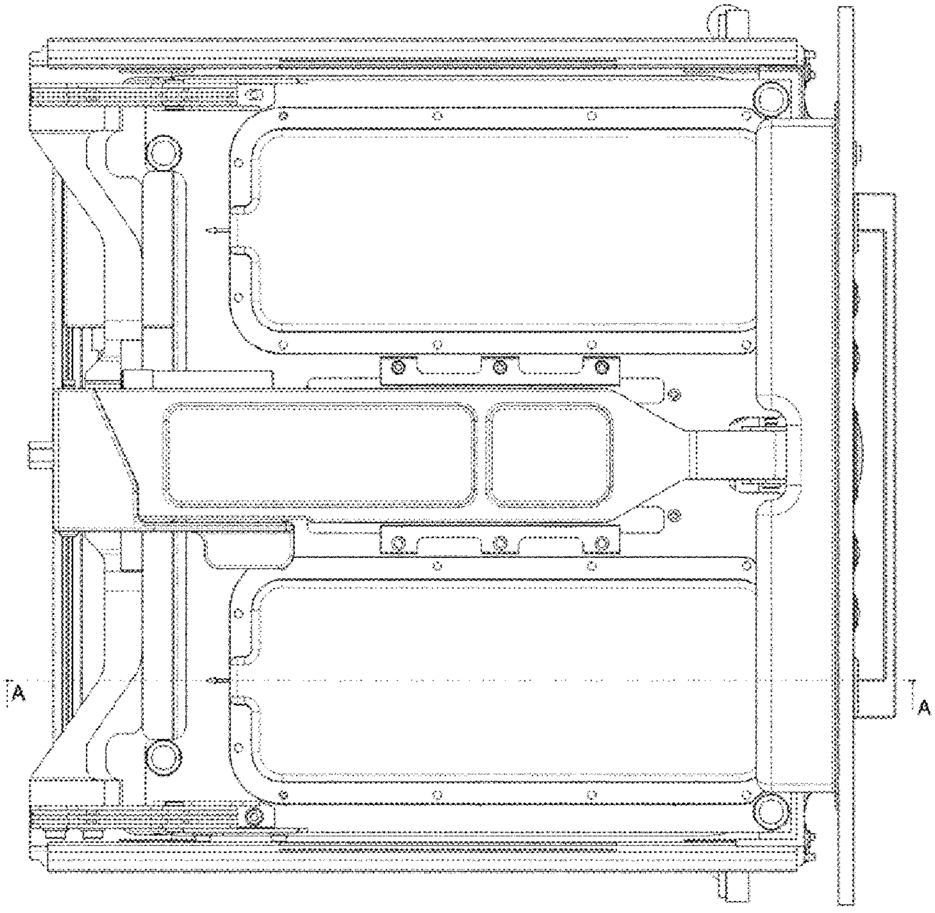
FIG. 15 shows a detail view of a device according to the invention.
Figure 16:
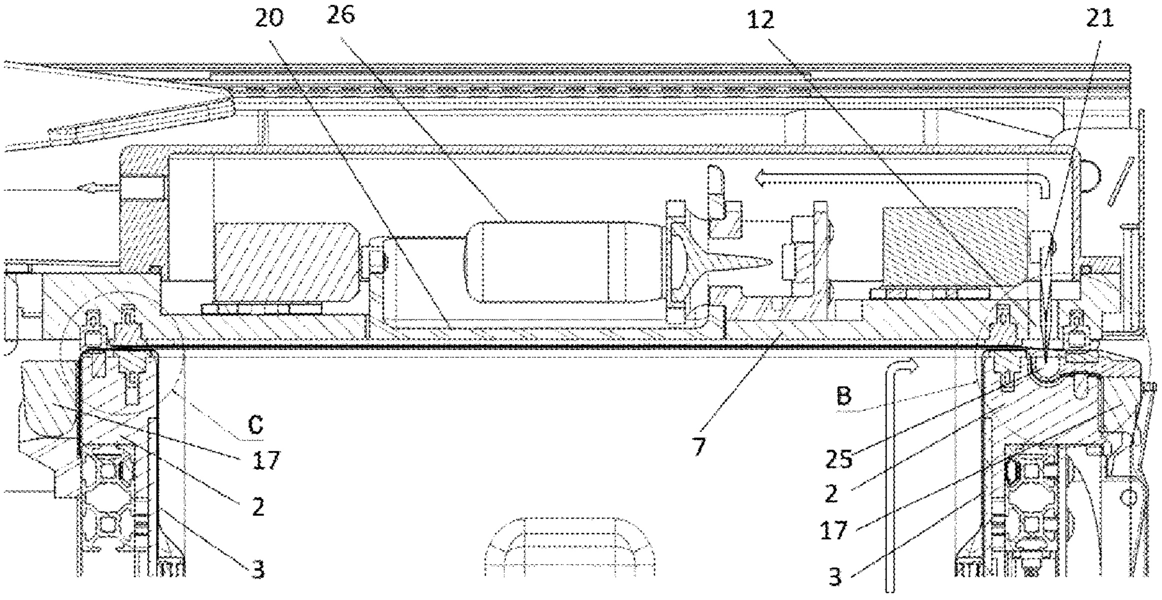
FIG. 16 shows a section A-A as indicated in FIG. 15.

FIG. 15 shows the device (1) according to the invention, schematically from above, in order to illustrate the position of the section A-A as shown in FIG. 16.

FIG. 16 shows the section A-A of FIG. 15. The illustration shows both the cover unit with a cover (7), the UV lamp (26) and the protection device (20) as well as the container opening. The perforation means (21), shown here as a blade protrudes through the aspiration opening (12) and perforates the part of the waste bag, or rather the separate part that covers the waste bag. This is shown in detail in FIGS. 17 and 19, which illustrate section B. Of the container (2), the side walls (3), the clamping frame (17) and the opening of the container are shown. The waste bag is also indicated, as well as the part of the waste bag, or rather the separate part that covers the waste bag, and therefore stretches over the container opening. This is shown in detail in FIGS. 17 to 20.

Figure 17:
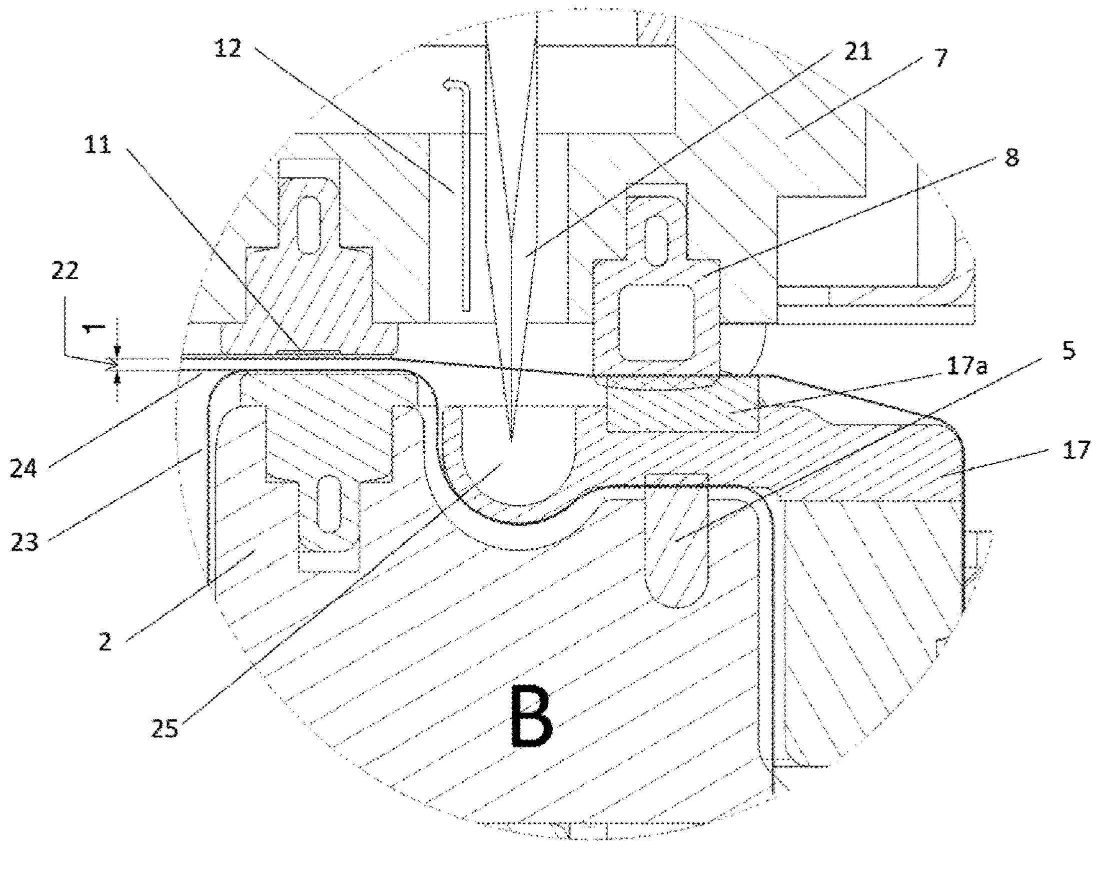
FIG. 17 shows a detail view B of the section A-A of FIG. 17.

FIG. 17 shows the section B from FIG. 16 with more details for the perforation and aspiration process step. Section B shows the upper edge of the container (2) with the first seal (5) at the opening of the container. The cover (7) is shown in the closed position, the second seal (8) on the cover interacts with the first seal (5), here over a part of the clamping frame (17), including a corresponding further seal (17*a*) on the clamping frame. The heat sealing means (11) are arranged on the cover, designed here as strip electrodes. A waste bag (23) is shown inside the container and lies inside the container against the side wall (3). The waste bag is stretched over the container opening by the means (17) for fastening the waste bag, designed here as clamping frames, in particular over the first seal (5) at the opening of the container. In the section B case, the clamping frame (17) presses the waste bag (23) directly onto the first seal (5), since the clamping frame (17) here, including the further seal (17*a*) on the clamping frame protrudes above the first seal (5). In regions where the means (17) for fastening the waste bag do not protrude above the first seal (5), as shown for example in FIG. 4 and discussed with FIG. 4, the means (17) for fastening the waste bag stretch the waste bag only over the first seal (5). In order to seal the waste bag on reaching the specified fill level, according to the invention, a part, for example a flap of the waste bag, or preferably a separate part (24) of the waste bag, for example from a continuous roll, must be placed over the container opening. This typically takes place manually with the container unit pulled out, however, appropriate means can also be provided, which automatically position the separate part, for example a flap of the waste bag or, preferably, a separate part (24), for example from a continuous roll, over the container opening. This can also be envisaged for the container unit in the retracted position as shown in FIG. 1. After retracting the container unit into the device (1) according to the invention, which can be envisaged and carried out manually or automatically, e.g. at the touch of a button, the cover is brought to the closed position as shown in FIG. 17. In this case, the second seal (8) of the cover is pressed onto the clamping frames (17) including a corresponding further seal (17*a*), and this onto the first seal (5). In regions where the clamping frame does not protrude above the first seal (5), as shown for example in FIG. 4 and discussed with FIG. 4, the clamping frame stretches the waste bag only over the first seal (5). Here, the second seal (8) of the cover is pressed directly onto the first seal (5). In either case, the second seal (8) of the cover seals the part of the waste bag, for example a flap of the waste bag, or preferably the separate part (24) against the waste bag (23). In this position, the interior of the waste bag is hermetically sealed with respect to the surroundings. However, this also means that in this condition, the atmosphere could not be aspirated from the interior of the waste bag, or the atmosphere could not escape from the interior of the waste bag by compressing the waste bag. In order to allow this, a defined opening is made in the closing tab of the waste bag by means of the perforation means (21). The perforation recess (25) made by the clamping frame (17) by overlapping the first seal (5) allows selective perforation of the overlapping part of the waste bag, for example a flap of the waste bag, or preferably the separate part (24) as shown in FIG. 17. As FIG. 17 also shows in section B, according to a preferred embodiment of the present invention, the fastening means (17) are used to form a recess (25) for perforation. Without the perforation recess (25), which is preferably formed by the clamping frames while overlapping the first seal (5), when closing the waste bag for sealing, the closing tab (part of the waste bag or a separate part) and the waste bag would lie directly on top of each other, so that it would not be possible for the perforation means (21) to selectively perforate only the closing tab. The perforation recess (25) therefore protects the waste bag against the perforation means (21), the latter can therefore only perforate the closing tab. After completing the perforation, part of the atmosphere can be aspirated from the interior of the waste bag through the aspiration opening (12), as indicated by the arrow, or part of the atmosphere can escape from the interior of the waste bag by compressing same, and in fact through the aspiration slot (22), which remains between the waste bag (23) and the overlapping part of the waste bag, for example a flap of the waste bag or preferably the separate part (24).

Figure 18:
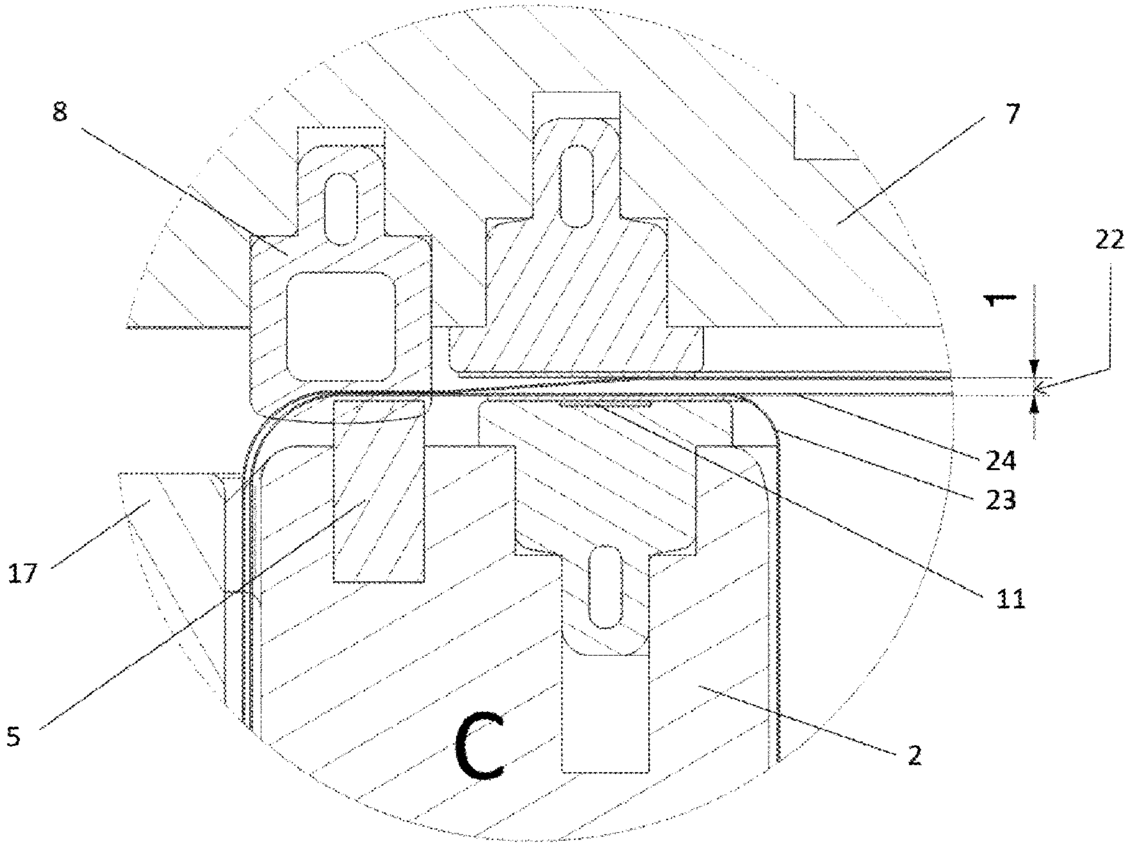
FIG. 18 shows a detail view C of the section A-A of FIG. 17.

FIG. 18 shows a section C from FIG. 16 with more details corresponding to the perforation and aspiration process step as in FIG. 17. Section C shows the upper edge of the container (2) with the first seal (5) at the opening of the container. The cover (7) is shown in the closed position, the second seal (8) on the cover interacts with the first seal (5). The heat sealing means (11) are arranged on the container, designed here as strip electrodes. A waste bag (23) is placed in the container and lies inside the container against the side wall (3). The waste bag is stretched over the container opening by the means (17) for fastening the waste bag, designed here as clamping frames, in particular over the first seal (5) at the opening of the container. In order to seal the waste bag according to the invention, a part, for example a flap of the waste bag, or preferably a separate part (24) of the waste bag, for example from a continuous roll, is placed over the container opening. As shown in FIG. 18, corresponding to FIG. 17, the cover is brought to the closed position. The second seal (8) of the cover is thereby pressed against the first seal (5), and the second seal (8) of the cover seals the part of the waste bag, for example a flap of the waste bag, or preferably the separate part (24), against the waste bag (23). In this position, the interior of the waste bag is hermetically sealed against the surroundings. The aspiration slot (22) between the waste bag (23) and the overlapping part of the waste bag, for example a flap of the waste bag, or preferably the separate part (24) remains between the heat sealing means (11) and the corresponding opposite mating surface.

Figure 19:
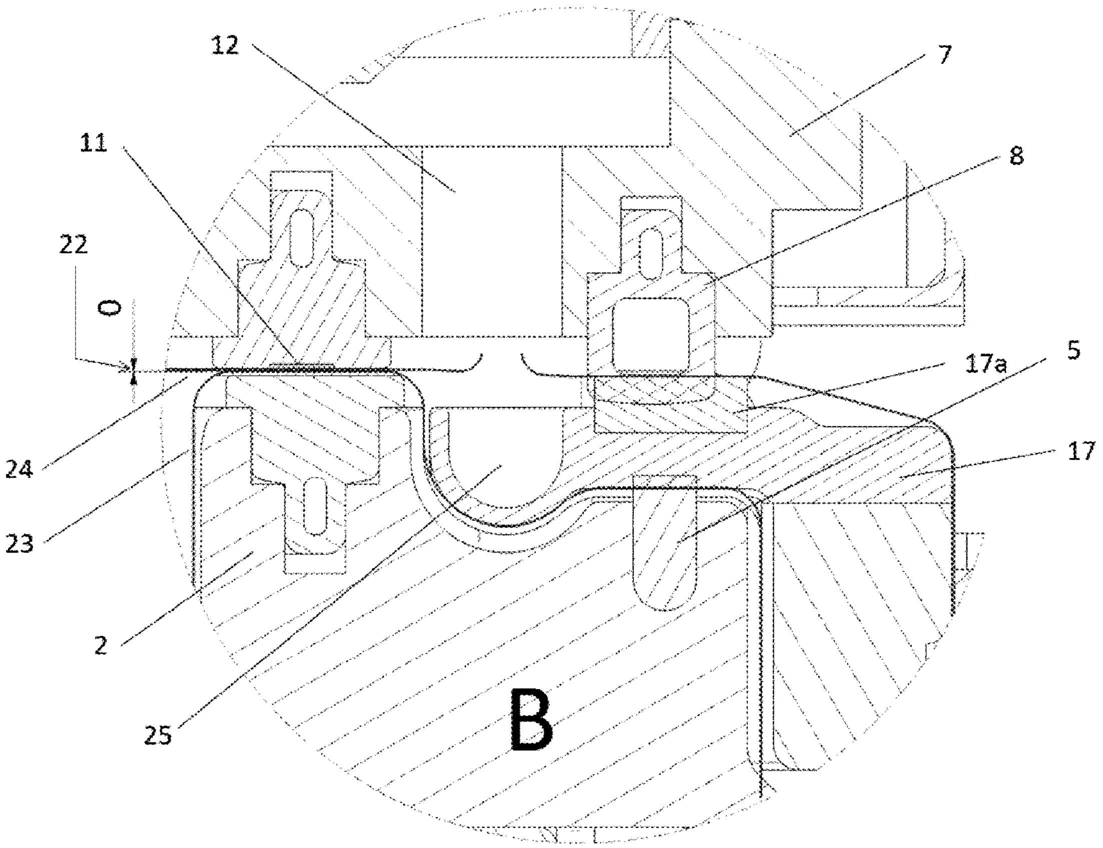
FIG. 19 shows a detail view B of the section A-A of FIG. 17.

FIG. 19 shows the section B from FIG. 16 with more details for the sealing process step. As in FIG. 17, the cover is also shown in the closed position, but lower down so as to allow the waste bag to be sealed. Here, the cover is moved further towards the upper edge of the container (2) with the first seal (5), the second seal (8) on the cover furthermore interacts with the first seal (5), here over a part of the clamping frame (17) including a further corresponding seal (17*a*). The heat sealing means (11) arranged on the cover, designed here as strip electrodes, now lie directly on the corresponding mating surface of the container opening, the aspiration slot (22) still present in FIG. 17 is closed. The waste bag (23) placed inside the container is therefore under the heat sealing means (11) with the part, for example a flap of the waste bag, or preferably a separate part (24) of the waste bag, for example from a continuous roll, in contact, and can be sealed to it and thereby sealed up.

Figure 20:
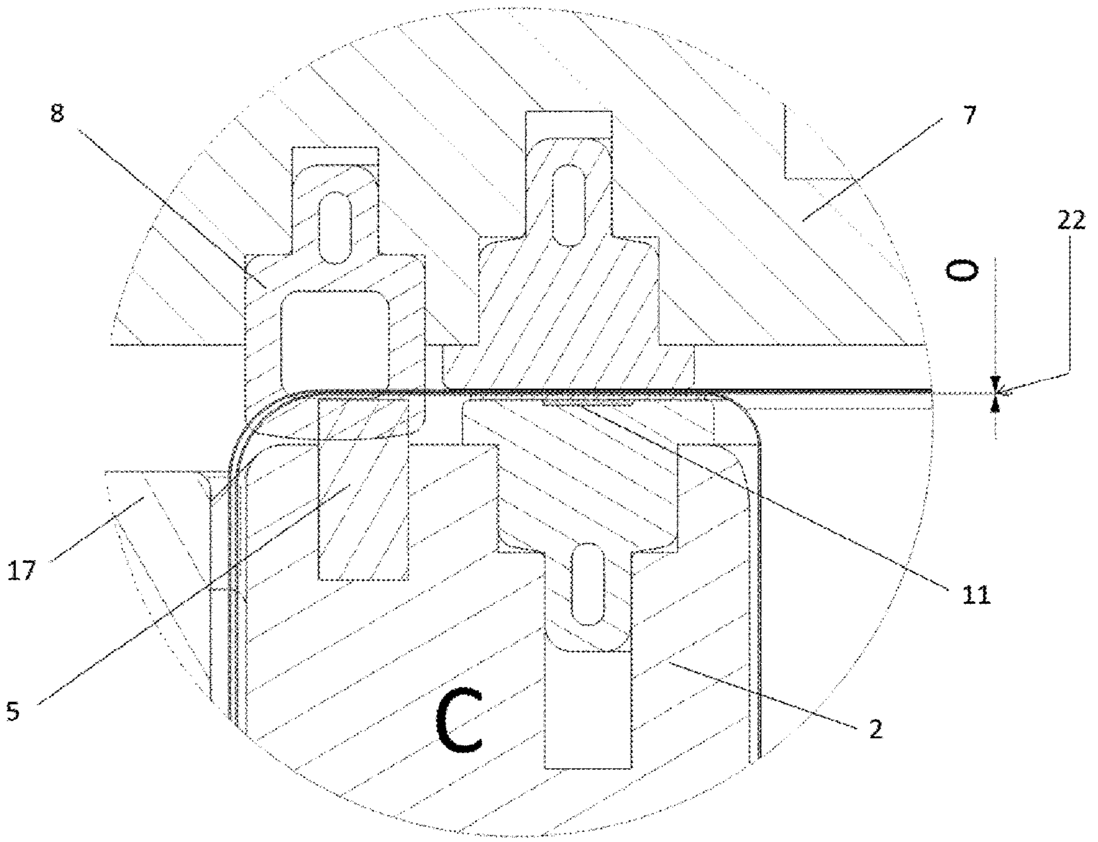
FIG. 20 shows a detail view C of the section A-A of FIG. 17.

FIG. 20 shows the section C from FIG. 16 with more details for the sealing process step. Compared with FIG. 18, the cover is also shown in the closed position, but lower down so as to allow the waste bag to be sealed. Here, the cover is moved further towards the upper edge of the container (2) with the first seal (5), the second seal (8) on the cover furthermore interacts with the first seal (5), here over a part of the clamping frame (17) including a further corresponding seal (17*a*). The heat sealing means (11) arranged on the container (2), designed here as strip electrodes, are now directly in contact with the corresponding mating surface of the cover, the aspiration slot (22) still present in FIG. 18 is closed. The waste bag (23) placed inside the container is therefore above the heat sealing means (11) with the part, for example a flap of the waste bag, or preferably a separate part (24) of the waste bag, for example from a continuous roll, in contact, and can be sealed to it and thereby sealed up.

Figure 21:
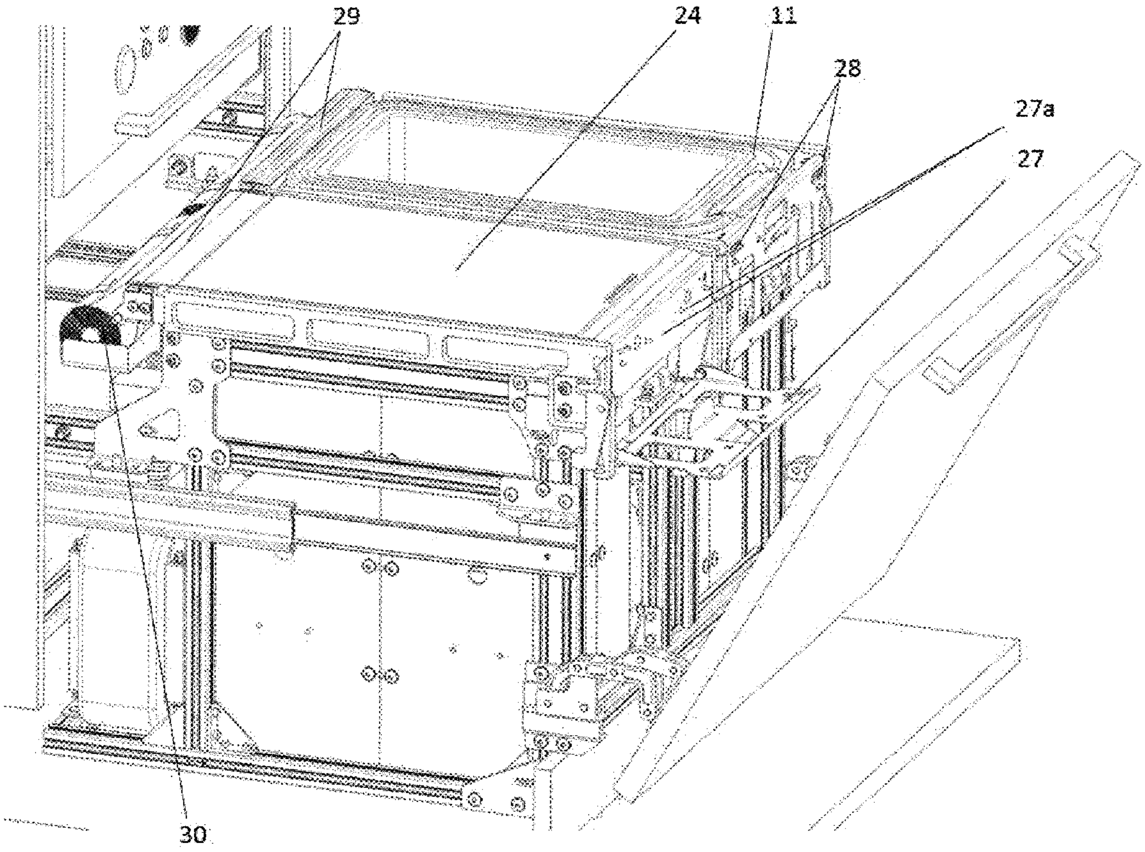
FIG. 21 shows a detail view of two containers of a device according to the invention.

FIG. 21 shows a section of a preferred device according to the invention, designed here as a base unit with a front panel, control element and base board, e.g. suitable as a kitchen unit. The pull-out middle part, fastened by the side pull-out runners, comprises the container unit, two containers here, shown in the pulled-out position with the front panel slightly folded down. In the embodiment shown, the heat sealing means (11) are disposed fully circumferentially on the opening of the container, which is preferred according to the invention. In the container shown in the foreground, the opening of the container is covered by a separate part (24) of the waste bag and therefore shown closed. The separate part (24) of the waste bag comes, as shown in the figure, from a roll (30) (continuous roll), which supplies several parts (24) of the waste bag provided to cover the waste bag. The roll (30) is preferably arranged at the rear end of the container, i.e. at the end of the container further distanced from the front panel. As in the condition shown in FIG. 21, the roll (30) is therefore preferably arranged such that, in order to close the waste bag, according to the invention, a separate part (24) of the waste bag can be unrolled from the roll (30) and can be placed over the container opening. The part (24) of the waste bag can then be fastened by the means for fastening the closing tab (27) of the waste bag, designed here as a folding frame on the front side of the container. Here, the means (27) for fastening the closing tab of the waste bag of the part (24) of the waste bag preferably presses against spikes (27*a*) for fastening the closing tab of the waste bag. Means (29) for cutting, designed here as cutting electrodes are typically present between the roll (30) and the opening of the container. Alternatively, the cutting means (29) can also be designed as a tear bar. Circuit breakers (28) are preferably arranged such that they are activated when the part (24) of the waste bag is correctly placed over the container opening. This arrangement allows, as soon as the part (24) of the waste bag which will close the waste bag, is placed over the container opening, the part (24) to be fastened by the means for fastening the closing tab (27) of the waste bag, wherein the circuit breakers (28) are activated when the part (24) is correctly placed over the container opening. The waste bag can then be sealed and therefore closed by the heat sealing means (11) fully circumferentially on the container opening and, preferably after the waste bag has been sealed, the part (24) is cut from the roll (30) by the cutting means (29). Finally, the sealed waste bag can be removed from the container after opening the means for fastening the closing tab (27) and the means (17) for fastening the waste bag.

Figure 22:
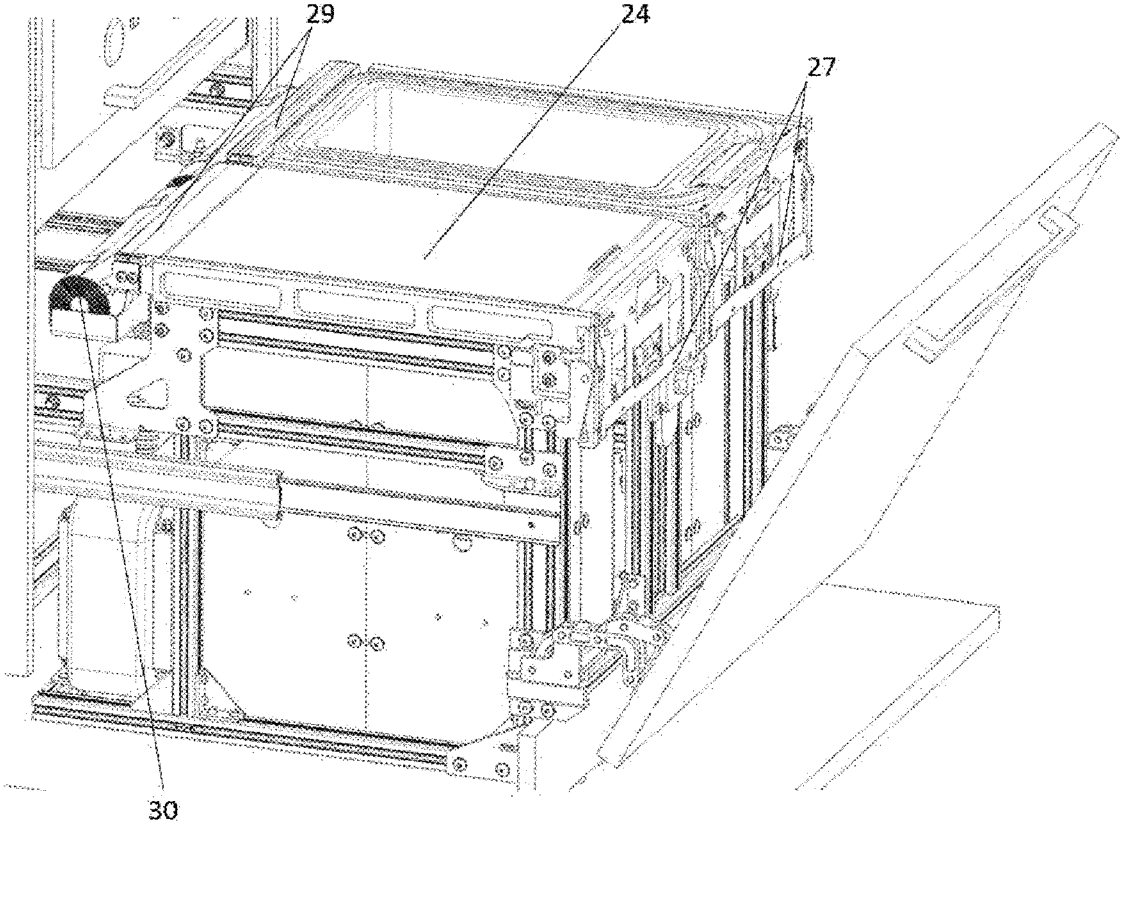
FIG. 22 shows a detail view of two containers of a device according to the invention.

FIG. 22 shows the section of a preferred device according to the invention corresponding to FIG. 21. In the container shown in the foreground, the container opening is covered by a separate part (24) of the waste bag and is shown closed. Compared with FIG. 21, the means for fastening the closing tab (27) of the waste bag, designed here as folding frames on the front side of the container, are shown closed. The part (24) of the waste bag is therefore fastened. Here, the means for fastening the closing tab (27) of the waste bag of the part (24) of the waste bag preferably presses against spikes (27*a*) for fastening the closing tab of the waste bag and activates the circuit breakers (28) (not shown here).

Figure 23:
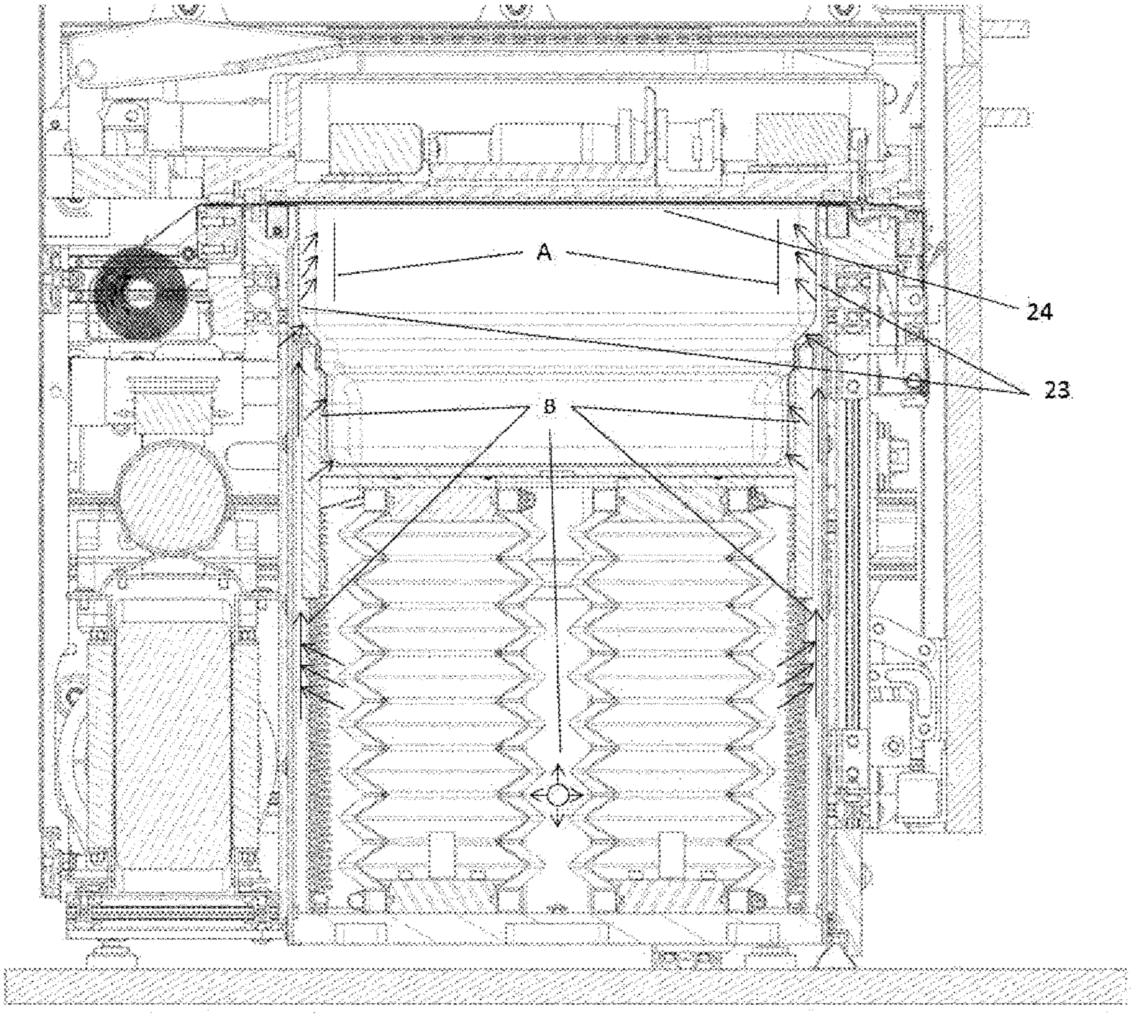
FIG. 23 shows a section through the device according to the invention of FIG. 22.

FIG. 23 shows a section through a preferred device according to the invention corresponding to FIG. 16. In the container shown, the container opening is covered by a separate part (24) of the waste bag and the waste bag (23) placed inside is therefore shown closed. The separate part (24) of the waste bag comes as shown in the figure from a roll (30) (continuous roll), which supplies several parts of the waste bag (24) provided to cover the waste bag. In the process according to the invention, three means are used simultaneously to reduce the waste volume, firstly, aspiration of the gaseous atmosphere from the waste bag, secondly, mechanical compression which is used to assist the removal of the gaseous atmosphere, and above all allows higher pressures on the waste, and thirdly and finally, application of compressed air on the outside of the waste bag. The aspiration of the gaseous atmosphere from the waste bag which produces negative pressure inside the waste bag, is shown in the figure as "A". The compression loading is illustrated by the arrows marked "B". The latter is done by injecting compressed air into the container, here under the base plate. The compressed air flows past the seals of the base plate and acts on the waste bag, which is sealed against the cover. The force due to raising the base plate results in mechanical compression of the waste.

Figure 24:
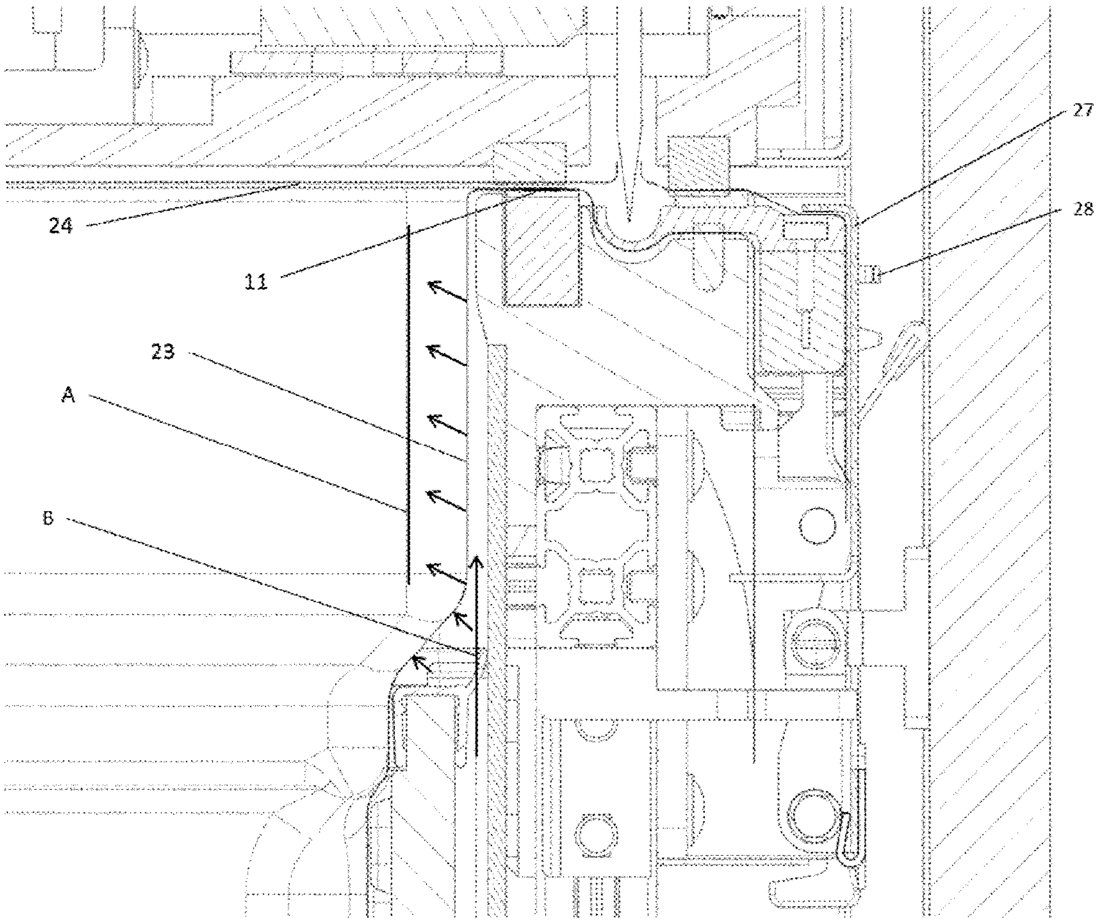
FIG. 24 shows a detail view from FIG. 23.

FIG. 24 shows a section corresponding to FIG. 17 with more details of the process step of perforation and aspiration, as well as the air pressure loading. The upper edge of the container is shown, the cover is in the closed position, the second seal on the cover interacts with the first seal, here over a part of the clamping frame including a corresponding further seal on the clamping frame (as in FIG. 17). The heat sealing means (11) are arranged at the container opening, designed here as strip electrodes. A waste bag (23) is shown in the container and lies inside the container against the side wall (and the base plate, not shown here). The waste bag is stretched over the container opening by the means for fastening the waste bag, designed here as clamping frames. In order to close the waste bag when the specified fill level is reached, according to the invention, a part, for example a flap of the waste bag or, preferably a separate part (24) of the waste bag, for example from a continuous roll, is placed over the container opening. This typically happens manually with the container unit pulled out, but appropriate means can also be envisaged, which position the separate part (24), for example from a continuous roll, automatically over the container opening. The separate part (24) of the waste bag is clamped by the means for fastening the closing tab (27) of the waste bag, a correctly placed part (24) activates the circuit breakers (28). With the cover in the closed position, the second seal of the cover is positioned directly on top of the first seal of the container (see more precisely in FIG. 17). The seals of the cover and of the container seal the separate part (24) against the waste bag (23). In this position, the interior of the waste bag is hermetically sealed against the surroundings. In order to allow the atmosphere to be aspirated from the interior of the bag, a defined opening is made in the closing tab of the waste bag by the perforation means. After completing the perforation, a part of the atmosphere can be aspirated from the interior of the waste bag through the aspiration opening in the cover, or a part of the atmosphere can escape from the interior of the waste bag by compressing same. The aspiration of the gaseous atmosphere from the waste bag, which produces a negative pressure in the waste bag is shown as "A" in the figure. The pressure loading is illustrated by the arrows marked "B". The latter is done by injecting compressed air into the container, here under the base plate. The compressed air flows past the seals of the base plate and acts on the waste bag, which is sealed against the cover. The force due to raising the base plate results in mechanical compression of the waste.

Figure 25:
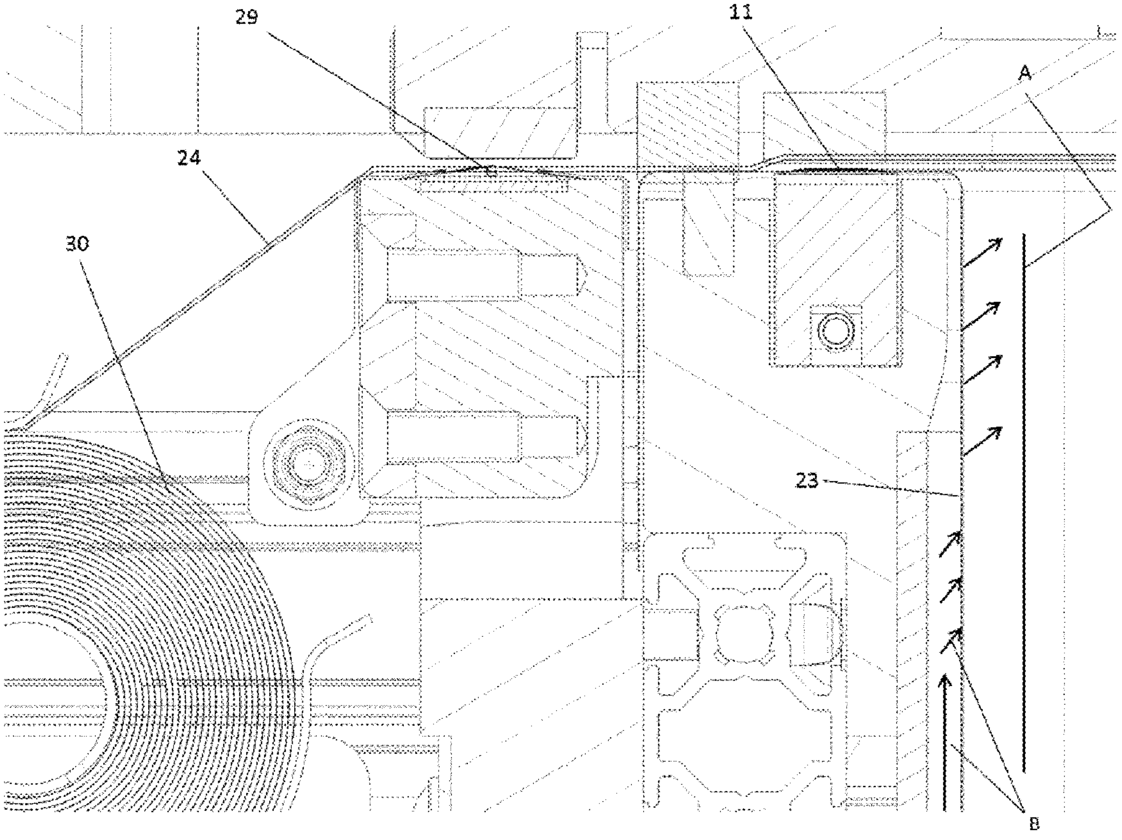
FIG. 25 shows a detail view from FIG. 23.

FIG. 25 shows the section corresponding to FIG. 24 at the other end of the container, corresponding to FIG. 18. The upper edge of the container is shown, the cover is in the closed position, the second seal on the cover interacts with the first seal (as in FIG. 18). The heat sealing means (11) are arranged at the container opening, designed here as strip electrodes. A waste bag (23) placed inside the container is shown. The waste bag is stretched over the container opening by the means for fastening the waste bag, designed here as clamping frames. According to the illustrated preferred embodiment, a separate part (24) of the waste bag from a roll (30) is positioned over the container opening and the waste bag placed inside it, typically manually with the container unit pulled out, however, appropriate means can also be provided, which automatically position the separate part (24) over the container opening. The seals of the cover and of the container seal the separate part (24) against the waste bag (23). The aspiration of the gaseous atmosphere from the waste bag, which produces a negative pressure in the waste bag is shown as "A" in the figure. The pressure loading is illustrated by the arrows marked "B". After the aspiration, the waste bag is closed by sealing it to the separate part (24), and the latter is cut off the roll (30) by the means (29) for cutting the separate part, designed here as cutting electrode.

A waste container is thereby provided, in which a comparatively large quantity of waste can be collected and stored, which can be compacted to the maximum and subsequently cleanly disposed of, and which at the same time is easy to operate.

REFERENCE SIGNS LIST

1 Device
2 Container
3 Side walls
4 Base plate
5 First seal at the container opening
6 Container opening
7 Cover
8 Second seal on the cover
9 Means for producing compressed air
10 Means for producing negative pressure
11 Heat sealing means
11*a* Control for the heat sealing means
12 Aspiration opening on the cover
13 Seal on the base plate
14 Means for moving the base plate
15 Inlet port in the container
16 Inlet valve for compressed air
17 Means for fastening a waste bag
17*a* Seal on the means for fastening a waste bag
18 Container bottom
19 Activated carbon filter
20 Protection device for UV lamp
21 Perforation means
22 Aspiration slot
23 Waste bag
24 Flap of the waste bag or separate part
25 Recess for perforation
26 UV lamp
27 Means for fastening the cover panel of the waste bag
27*a* Spikes for fastening the cover panel of the waste bag
28 Circuit breaker
29 Means for cutting the separate part
30 Roll of the separate part for covering the waste bag

The invention claimed is:

1. A device for collecting and compacting waste comprising a) a container for accommodating a waste bag, the container comprising side walls, a moving base plate inside and a first seal at an opening, b) a cover with a second seal, wherein the cover is configured and arranged such that:

the cover can be brought to an open position with respect to the opening of the container, so that the opening of the container is accessible for placing the waste bag inside, and the cover can be brought to a closed position with respect to the opening of the container, so that the cover interacts positively with the opening of the container such that the waste bag placed inside the container between the first seal and the second seal can be sealed airtight against the cover, c) means for producing compressed air, d) means for producing negative pressure, and e) means for heat sealing the waste bag placed inside the container when the cover is in the closed position, wherein the means are situated at the opening of the container and/or on the cover, wherein:

the cover has an aspiration opening, which is arranged on the cover such that in the closed position, wherein the waste bag is sealed airtight between the first seal and the second seal, a gaseous atmosphere can be partially aspirated from the interior of the waste bag through the aspiration opening by means of the means for producing negative pressure, when the opening is closed, the container is sealed airtight, the base plate of the container can be moved with respect to the side walls and, in the closed position, in the direction of the cover, the device has means for moving the base plate with respect to the side walls, and the container has an inlet port for compressed air, which, controlled by means of an inlet valve, can be charged with compressed air supplied by the means for producing compressed air, the inlet port being in fluid communication with a space between the waste bag and the container located between the base plate and the cover such that compressed air admitted through the inlet valve acts directly on an outer surface of the waste bag, the aspiration opening communicating with the interior of the waste bag, which, in the closed position, is closed off by the cover, the interior of the waste bag and the space between the waste bag and the container being isolated from one another by the airtight sealing of the waste bag between the first seal and the second seal, and wherein the device is configured for concurrent operation of the means for producing negative pressure through the aspiration opening and the means for producing compressed air through the inlet port.

2. The device according to claim 1, wherein the cover comprises means for perforating the waste bag.

3. The device according to claim 1, wherein the means for moving the base plate is driven by compressed air supplied by the means for producing compressed air.

4. The device according to claim 1, which is configured so that the compressed air used for the means for moving the base plate can also be delivered to the inlet port, controlled by an inlet valve.

5. The device according to claim 1, wherein the means for moving the base plate are pneumatically operated and comprise one or more pneumatic cylinders or one or more pneumatic bellows.

6. The device according to claim 1, wherein the means for producing negative pressure comprises a vacuum pump arranged in the cover.

7. The device according to claim 1, wherein the means for producing negative pressure comprise at least one of a filter and a liquid sensor.

8. The device according to claim 1, wherein the cover has means for irradiating the interior of the container with UV light.

9. The device according to claim 1, wherein the device has means for attaching the waste bag on the opening of the container.

10. A method for collecting and compacting waste comprising the step of aspirating part of a gaseous atmosphere from a waste bag that contains waste, with simultaneous mechanical compression of the waste bag and simultaneous external air pressure loading of the waste bag, wherein a device according to claim 1 is used.

11. The method according to claim 10, in which before the step of aspirating part of the gaseous atmosphere from the waste bag that contains waste, with simultaneous mechanical compression of the waste bag and external air pressure loading of the waste bag, a given step is first performed in which the waste bag is only mechanically compressed, followed by additional aspiration of a first part of the gaseous atmosphere from the waste bag.

12. The method according to claim 10, in which before the step of aspirating part of the gaseous atmosphere from the waste bag that contains waste, with simultaneous mechanical compression of the waste bag and external air pressure loading of the waste bag, the waste bag is sealed by means of a part of the bag or a separate part of the waste bag by pressing on the part, this part of the bag or a separate part of the waste bag is perforated to form a perforation port and part of the gaseous atmosphere is aspirated from the waste bag through the perforation port.

13. The method according to claim 10, which furthermore comprises a step of sealing the waste bag by heat sealing during or after aspiration of part of the gaseous atmosphere from the waste bag.

14. The device according to claim 1, wherein the base plate has a third seal configured to permit compressed air admitted through the inlet valve to pass from beneath the base plate into the space between the waste bag and the container, and the inlet port is disposed beneath the base plate.

15. The device according to claim 1, wherein the inlet port opens directly into the space between the waste bag and the container.

* * * * *